(12) United States Patent
Mori

(10) Patent No.: US 7,681,824 B2
(45) Date of Patent: Mar. 23, 2010

(54) WEBBING RETRACTING DEVICE

(75) Inventor: Shinji Mori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 144 days.

(21) Appl. No.: 11/765,144

(22) Filed: Jun. 19, 2007

(65) Prior Publication Data

US 2007/0290091 A1 Dec. 20, 2007

(30) Foreign Application Priority Data

Jun. 20, 2006 (JP) ............................. 2006-170536
Dec. 20, 2006 (JP) ............................. 2006-343277

(51) Int. Cl.
*B60R 22/38* (2006.01)

(52) U.S. Cl. ............... 242/382.1; 242/383.1; 242/383.2

(58) Field of Classification Search .................. 242/382, 242/382.1–382.2, 382.4, 383, 383.1–383.2
See application file for complete search history.

(56) References Cited

U.S. PATENT DOCUMENTS

| | | | |
|---|---|---|---|
| 5,071,194 A | 12/1991 | Foehl | |
| 6,068,208 A * | 5/2000 | Matsuki et al. | 242/383.2 |
| 6,443,380 B1 * | 9/2002 | Biller et al. | 242/374 |
| 6,840,474 B2 * | 1/2005 | Honl et al. | 242/374 |
| 6,883,742 B2 | 4/2005 | Sumiyashiki et al. | |
| 6,902,129 B2 * | 6/2005 | Grasser et al. | 242/383.1 |
| 7,384,014 B2 * | 6/2008 | Ver Hoven et al. | 242/382.2 |
| 2005/0184185 A1 * | 8/2005 | Holbein et al. | 242/374 |
| 2006/0243844 A1 * | 11/2006 | Kosugi et al. | 242/374 |

FOREIGN PATENT DOCUMENTS

| | | |
|---|---|---|
| EP | 0149085 A2 | 7/1985 |
| JP | 5-193441 A | 8/1993 |
| JP | 9-323618 A | 12/1997 |
| JP | 10-230817 A | 9/1998 |

\* cited by examiner

*Primary Examiner*—Sang Kim
(74) *Attorney, Agent, or Firm*—Robert Mlotkowski; Safran & Cole, P.C.; Thomas W. Cole

(57) ABSTRACT

A webbing retracting device that may prevent entering of an end-lock state when a spool rotates in the pull out direction on rebound just after completion of taking up of the webbing belt. A restriction weight is provided on a V gear. The restriction weight moves in the pull out direction relative to the V gear by acceleration when the V gear is rotated in the take up direction, and furthermore, the restriction weight pivots about a support pin under centrifugal force due to rotation of the V gear and attains a contact position. In such a state, even if the inertial mass attempts to displace toward the lock activation direction, the restriction weight interferes with the inertial mass and restricts displacement of the inertial mass toward the lock activation direction.

5 Claims, 21 Drawing Sheets

WEBBING RETRACTING DEVICE

CROSS-REFERENCE TO RELATED APPLICATION

This application claims priority under 35 U.S.C. 119 from Japanese Patent Applications No. 2006-170536 and No. 2006-343277, the disclosures of which are incorporated by reference herein.

BACKGROUND

1. Technical Field

The present invention is related to a webbing retracting device for taking up and storing a webbing belt for restricting the body of a vehicle occupant sitting in a seat.

2. Related Art

In webbing retracting devices that configure vehicle seat belt devices there are lock mechanisms provided that restrict rotation of a reel shaft in a pull out direction when a vehicle suddenly decelerates, for example as described in Japanese Patent Application Laid-open (JP-A) No. 05-193441 (Patent Publication 1). A lock gear configuring the lock mechanism described in Patent Publication 1 is coaxially rotatable relative to the reel shaft, and when the reel shaft rotates in the pull out direction relative to the lock gear, coupled to this relative rotation, the teeth of each of a main pawl and a backup pawl mesh with internal teeth formed on both side walls of a frame, and rotation of the reel shaft in the pull out direction is restricted. There are two types of configuration for generating relative rotation between the reel shaft and the lock gear, one being a deceleration detecting means. The deceleration detecting means is provided with an inertial body that moves with inertia when a vehicle suddenly decelerates, and an engaging pawl, pushed up by an inertially moved inertial body, engages with external teeth on the lock gear, thereby restricting rotation of the lock gear, and the lock gear rotates relative to the reel shaft that is rotating in the pull out direction.

Another configuration for generating relative rotation between the reel shaft and the lock gear is another inertial body, separate to the inertial body of the deceleration detection means, provided on the lock gear. This inertial body is connected to the lock gear by a spring, but when the reel shaft together with the lock gear suddenly rotates in the pull out direction, a rotational lag occurs of this inertial body against the biasing force due to the spring and relative to the lock gear. Along with the rotation relative to the lock gear due to the rotational lag, the inertial body moves to the outside in the rotational radial direction of the lock gear, and meshes with inner ratchet teeth that are formed on the inside of a cover, and rotation of the inertial body, and therefore rotation of the lock gear, is stopped. In this manner, by stopping the rotation of the lock gear, the lock gear rotates relative to the reel shaft that is rotating in the pull out direction.

However, just after completion of taking up the webbing belt by the reel shaft if the lock mechanism is unintentionally actuated, then the reel shaft is not able to rotate in the pull out direction from this state, entering a so-called "end-lock state". In such an end-lock state, since the reel shaft is not able to rotate in the pull out direction, pulling out of the webbing belt becomes difficult. Therefore, in the above Patent Publication 1, when taking up of the webbing belt is competed it is configured such that the external teeth of the lock gear and the engagement pawl of the deceleration detection means do not mesh together, so as to prevent an end-lock state arising.

SUMMARY

In consideration of the above circumstances, the present invention provides a webbing retracting device that can prevent an end-lock state arising when a spool rotates in the pull out direction due to a rebound (reaction) just after taking up of the webbing belt is stopped.

A first aspect of the present invention is a webbing retracting device including: a spool that, by rotation in a take up direction, takes up a longitudinal band-shaped webbing belt from a base end side of webbing belt and stores the webbing belt thereon; a rotational body provide so as to be able to rotate relative to the spool and connected to the spool so as to be able to rotate to follow rotation of the spool; a lock member that restricts rotation of the spool in a pull out direction by activation thereof; a rotation detection member, provided at the rotational body, that is displaced toward a predetermined lock activation direction to activate the lock member when the rotational body rotates in the pull out direction at a predetermined velocity or greater; and a restriction unit, provided at the rotational body, that restricts displacement of the rotation detection member toward the lock activation direction due to a rebound by stopping of taking up of the webbing belt to the spool.

According to the webbing retracting device according to the first aspect of the present invention, when the spool rotates to the take up direction side, the webbing belt is taken up and stored on the spool from the side of the longitudinal direction base end thereof. When the taking up of the webbing belt by the spool stops and the spool stops abruptly, with a rebound thereof the rotational body that rotates following the spool sometimes rotates suddenly, and by a small amount, in the pull out direction. The webbing retracting device of the present invention basically couples the sudden rotation of the rotational body in the pull out direction, the rotation detection member is displaced in the lock activation direction, and due to this the lock member locks the spool and restricts rotation of the spool in the pull out direction.

However, in the webbing retracting device of the present invention, when sudden rotation of the rotational body in the pull out direction is due to a rebound, when the spool stops taking up of the webbing belt, then displacement of the rotation detection member toward the lock activation direction is restricted by the restriction unit, and in such a case the lock member does not restrict rotation of the spool in the pull out direction (the so-called "end-lock state" does not arise). Therefore, the webbing belt may be easily pulled out once again.

A second aspect of the present invention is the webbing retracting device according to the first aspect of the present invention, further including a prevention member that, in a state in which the rotational body is rotating in the pull out direction, which is different from a state in which the rotational body is rotated in the pull out direction caused by the rebound by stopping of taking up of the webbing belt, prevents restricting, by the restriction unit, of the displacement of the rotation detection member toward the lock activation direction.

According to the webbing retracting device according to the second aspect of the present invention, when the rotational body is in a state rotating in the pull out direction that is not when the taking up of the webbing belt has stopped, then restriction by the restriction unit of displacement of the rotation detection member toward the lock activation direction is prevented by the prevention member. Due to this, by that the body of an occupant moves in a direction substantially to the front of a vehicle, due to inertia as the vehicle decelerates, and thereby suddenly the webbing belt is pulled by the body of the occupant, when the rotational body together with the spool suddenly rotates in the pull out direction, the rotation detection member can displace in the lock activation direction, and rotation of the spool in the pull out direction can be restricted by actuation of the lock member.

A third aspect of the present invention is the webbing retracting device according to the first aspect or the second aspect of the present invention wherein: the restriction unit is provided so as to be movable between a contact position, in which the restriction unit is in contact with the rotation detection member and is able to restrict displacement of the rotation detection member to the lock activation direction, and a non contact position, which is separated from the contact position and which allows displacement of the rotation detection member toward the lock activation direction; and the restriction unit displaces to the contact position by rotation of the rotational body in the take up direction.

According to the webbing retracting device according to the third aspect of the present invention, the restriction unit is separated from the non contact position by the rotation of the rotational body in the take up direction. In doing so the restriction unit can be moved to the contact position. In the state just after rotation of the spool in the take up direction has stopped, the restriction unit is positioned in the contact position. From this state, the restriction unit contacts with the rotation detection member and restricts displacement of the rotation detection member, if the rotation detection member attempts to displace toward the lock activation direction by sudden rotation of the rotational body, by a small amount, in the pull out direction.

Here, as described above, since the restriction unit is configured to separate from the non contact position by rotation of the rotational body in the take up direction, basically (that is to say if it is not a case in which the rotational body rotates in the pull out direction by a rebound when the spool has stopped taking up of the webbing belt), if the rotational body rotates in the pull out direction, there is no separation of the restriction unit from the non contact position, and therefore the restriction unit does not attain the contact position. Therefore, when the spool rotates in the pull out direction in normal operation and also when the spool rotates in the pull out direction as the vehicle suddenly decelerates and the rotational body rotates in the pull out direction, there is no movement of the restriction unit to the contact position, and the restriction unit does not unintentionally interfere with the displacement of the rotation detection member.

A fourth aspect of the present invention is the webbing retracting device according to the third aspect of the present invention, wherein the restriction unit in the non contact position is moved to the contact position by centrifugal force by the rotating of rotational body.

According to the webbing retracting device according to the fourth aspect of the present invention, the restriction unit, which is in the non contact position, and thereafter, which is separated from the non contact position by the acceleration of the rotational body in the take up direction, moves toward the contact position due to the centrifugal force by the rotation of the rotational body. The restriction unit that is moved in this manner, in the state of having attained the contact position, contacts with the rotation detection member and restricts displacement of the rotation detection member, when the rotation detection member attempts to displace in the lock activation direction by the sudden rotation, by a small amount, of the rotational body in the pull out direction just after the rotation of the spool stops in the take up direction.

A fifth aspect of the present invention is the webbing retracting device according to the third aspect or the fourth aspect, wherein the restriction unit in the non contact position is moved to the contact position by generation of a frictional force by the rotation of the rotational body.

According to the webbing retracting device according to the fifth aspect of the present invention, the restriction unit in the non contact position is moved to the contact position by a frictional force generated by rotation of the rotational body. The restriction unit moved in this manner in the state of having attained the contact position, contacts with the rotation detection member and restricts displacement of the rotation detection member, when the rotation detection member attempts to displace in the lock activation direction by the sudden rotation, by a small amount, of the rotational body in the pull out direction just after the rotation of the spool stops in the take up direction.

A sixth aspect of the present invention is the webbing retracting device according to one of the third aspect to the fifth aspect, further including a biasing member that biases the restriction unit from the contact position toward the non contact position.

According to the webbing retracting device according to the sixth aspect of the present invention, the restriction unit is biased by the biasing member in the direction from the contact position toward the non contact position. Due to this, the restriction unit that has attained the contact position, after restricting the displacement of the rotation detection member toward the lock activation direction, then returns to the non contact position by the biasing force of the biasing member.

A seventh aspect of the present invention is the webbing retracting device according to the sixth aspect, wherein the biasing member biases the rotation detection member in the opposite direction to the lock activation direction.

According to the webbing retracting device according to the seventh aspect of the present invention, the rotation detection member is biased by the biasing member in the opposite direction to the lock activation direction. Due to this, when rotation of the rotational body in the pull out direction, at a predetermined velocity or greater, ceases, the rotation detection member that has been displaced in the lock activation direction is displaced in the opposite direction to the lock activation direction by the biasing force of the biasing member, and returns to the original state. Due to this, the restriction on the rotation of the spool by the lock member is thus released.

Here, in the webbing retracting device according to the present invention, the biasing member biases the rotation detection member in the opposite direction to the lock activation direction, and also biases the restriction unit in the direction from the contact position toward the non contact position, therefore the biasing of the rotation detection member and the biasing of the restriction unit is by a single component, and the number of components may thereby be reduced.

An eighth aspect of the present invention is the webbing retracting device according to one of the first aspect to the seventh aspect further including an additional biasing member that biases the rotation detection member in the opposite direction to the lock activation direction.

According to the webbing retracting device according to the eighth aspect of the present invention, the additional biasing member biases the rotation detection member in the opposite direction to the lock activation direction. Therefore, the rotation detection member can be biased appropriately in the opposite direction to the lock activation direction.

A ninth aspect of the present invention is the webbing retracting device according to one of the first aspect to the eighth aspect, wherein the restriction unit includes: a moving member that is moved by the rebound when taking up of the webbing belt to the spool stops; and a restriction member that is moved by the movement of the moving member and restricts displacement of the rotation detection member toward the lock activation direction.

According to the webbing retracting device according to the ninth aspect of the present invention, the restriction unit includes a moving member and a restriction member, and by the moving member moving, due to the rebound when taking up of the webbing belt to the spool stopping, the restriction member is moved, and displacement of the rotation detection member toward the lock activation direction is restricted. Therefore, the restriction unit can be appropriately actuated.

A tenth aspect of the present invention is the webbing retracting device according to any one of the first aspect to the eighth aspect, wherein the restriction unit includes: a friction force generation member that generates a friction force due to rotation of the rotational body and is moved; and a displacement restriction member that is moved by movement of the friction force generation member and restricts displacement of the rotation detection member toward the lock activation direction.

According to the webbing retracting device according to the tenth aspect of the present invention, the restriction unit includes a friction force generation member and a displacement restriction member, and the friction force generation member generates a frictional force due to rotation of the rotational body and is moved, thereby the displacement restriction member is moved, and the rotation detection member is restricted from displacement to the lock activation direction. Therefore, the restriction unit may be appropriately actuated.

An eleventh aspect of the present invention is a webbing retracting device including: a spool that, by rotation in a take up direction, takes up a longitudinal band-shaped webbing belt from a base end side of webbing belt and stores the webbing belt thereon; a rotational body provide so as to be able to rotate relative to the spool and connected to the spool so as to be able to rotate to follow rotation of the spool; a lock member that restricts rotation of the spool in a pull out direction by activation thereof; a rotation detection member, provided at the rotational body, that is displaced toward a predetermined lock activation direction to activate the lock member when the rotational body rotates in the pull out direction at a predetermined velocity or greater; and a restriction unit, provided at the rotational body, that restricts displacement of the rotation detection member toward the lock activation direction due to a rebound by stopping of taking up of the webbing belt to the spool, wherein the restriction unit is activated by inertia thereof and centrifugal force generated by the rotating of rotational body.

A twelfth aspect of the present invention is a webbing retracting device including: a spool that, by rotation in a take up direction, takes up a longitudinal band-shaped webbing belt from a base end side of webbing belt and stores the webbing belt thereon; a rotational body provide so as to be able to rotate relative to the spool and connected to the spool so as to be able to rotate to follow rotation of the spool; a lock member that restricts rotation of the spool in a pull out direction by activation thereof; a rotation detection member, provided at the rotational body, that is displaced toward a predetermined lock activation direction to activate the lock member when the rotational body rotates in the pull out direction at a predetermined velocity or greater; and a restriction unit, provided at the rotational body, that restricts displacement of the rotation detection member toward the lock activation direction due to a rebound by stopping of taking up of the webbing belt to the spool, wherein the restriction unit is activated by generation of a frictional force by the rotation of the rotational body.

As explained above, the webbing retracting device according to the present invention can extremely effectively prevent the so-called end-lock state even if, just after stopping taking up the webbing belt, the spool rotates in the pull out direction with the rebound thereto.

BRIEF DESCRIPTION OF THE DRAWINGS

Exemplary embodiments of the present invention will be described in detail based on the following figures, wherein.

DETAILED DESCRIPTION

First Exemplary Embodiment

Configuration of the First Exemplary Embodiment

Figure 2:
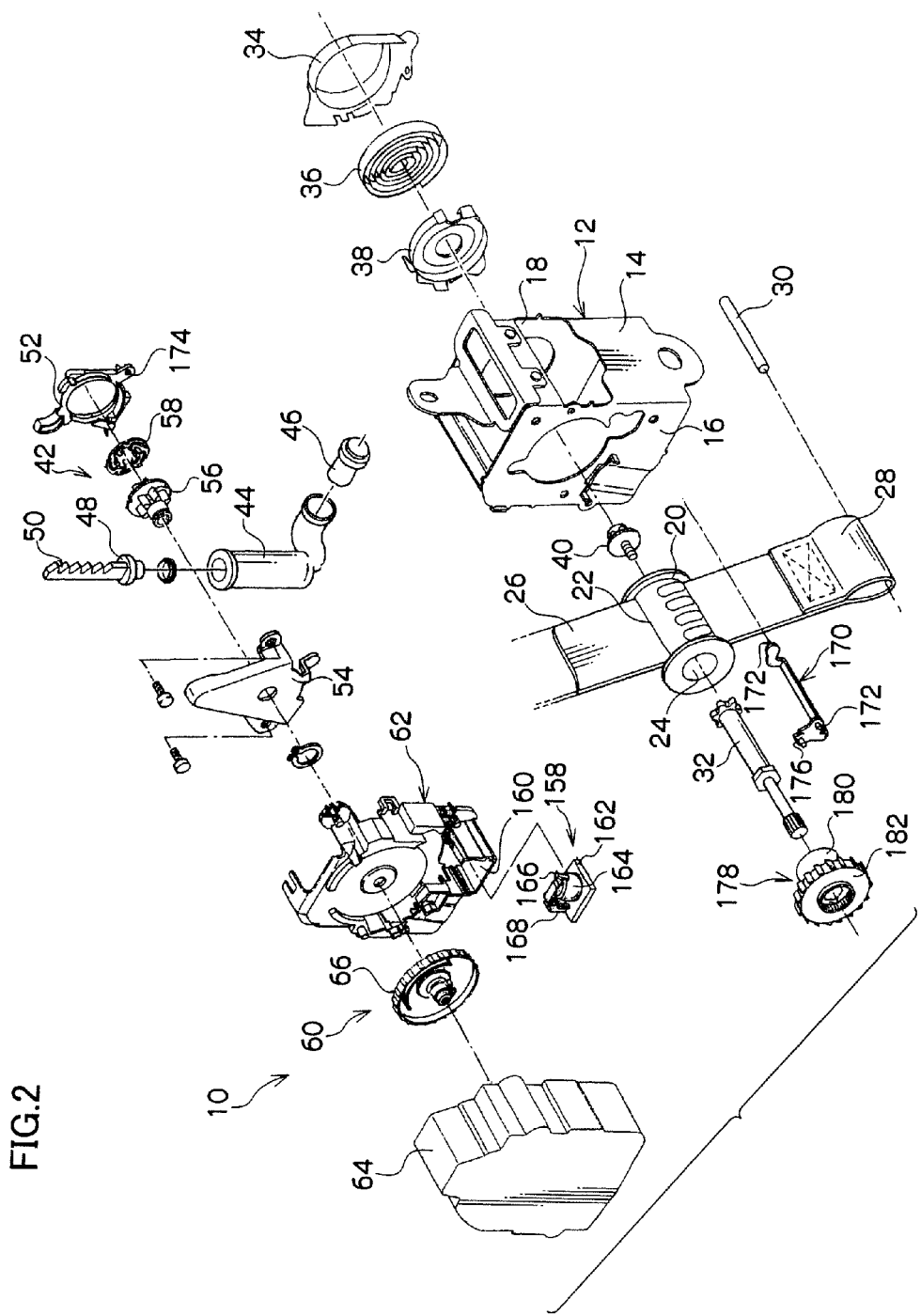
FIG. 2 is an exploded perspective view showing a configuration of relevant portions of a webbing retracting device according to the first exemplary embodiment of the present invention.

In FIG. 2 the overall outline configuration of a webbing retracting device according to a first exemplary embodiment of the present invention is shown through an exploded perspective view.

As is shown in the figure, a webbing retracting device 10 is provided with a frame 12. The frame 12 is, for example, provided with a back plate 14 that is a plate shape with a thickness direction thereof that is in the substantially left-right direction of a vehicle. The present webbing retracting device 10 is a structure that is attached to a vehicle body, by the back plate 14 being fixed with fasteners, such as bolts or the like, for example, to a vehicle body in the vicinity of a lower end of a center pillar. A leg plate 16 is formed from one width direction side of the substantially vehicle front-rear direction back plate 14, bent around toward the inside in the width direction of the vehicle (substantially the vehicle left-right direction). Also, a leg plate 18 is formed at the other width direction side of the back plate 14, bent around in the same direction as leg plate 16 is formed.

A spool 20 is provided between the leg plate 16 and the leg plate 18. The spool 20 is formed as a substantially cylindrical shape with an axial direction that is in the direction along which the leg plate 16 and the leg plate 18 face each other. There is an insertion through hole 22 formed in the spool 20. Both ends of the insertion through hole 22 open to outer peripheral portions of the spool 20, and the shape of the openings are slit shapes that have length directions in the spool 20 axial direction. The insertion through hole 22 is formed so as to avoid a through hole 24 that penetrates the axial portion of spool 20, and the base end side in the length direction of a long band-shaped webbing belt 26 is pushed through from one of the opening ends of the insertion through hole 22.

At a base end portion in the length-wise direction of the webbing belt 26 is formed a cylindrical shaped portion 28, with a through hole in the width direction of the webbing belt 26, and, by disposing a detachment prevention shaft 30 at the inside of the cylindrical shaped portion 28 that has been inserted through the insertion through hole 22, when the webbing belt 26 is pulled toward the distal end side, the base end side of the webbing belt 26 is prevented from being pulled out of the insertion through hole 22. The webbing belt 26, prevented from detachment from the insertion through hole 22 in such a way, is stored by being taken up by winding up in layers from the base end thereof onto the outer peripheral portion of the spool 20, by rotation of the spool 20 in the take up direction that is one of the directions of rotation around its own axis.

A bar-shaped torsion shaft 32 having a length direction in the axial direction of the spool 20 is disposed at the inside of the through hole 24. The torsion shaft 32 is connected to the spool 20 in a state in which pivoting is prevented inside the spool 20 around the axial rotation direction at the leg plate 18 side. Furthermore, the end portion of the torsion shaft 32 on the leg plate 18 side passes through the leg plate 18 and protrudes to the outside of the frame 12.

A spring cover 34 is disposed on the outside of the leg plate 18. The spring cover 34 is of a case-shape that is open to face the inside of leg plate 18, and the spring cover 34 is fixed to the leg plate 18 by fasteners such as screws or the like and by fitting together fitment lugs or the like that are formed on the spring cover 34 or on the leg plate 18. A spiral spring 36 is accommodated on the inside of the spring cover 34. The spiral spring 36 is of a construction such that there is a gradual increase in a biasing force thereof when the inside end in the spiral winding direction is rotationally displaced in a pull out direction relative to the outside end in the spiral winding direction, the pull out direction being the opposite direction to the above take up direction. The outside end in the spiral winding direction of the spiral spring 36 is anchored at a spring seat 38 that is provided to the opening side of the spring cover spring cover 34.

The spring seat 38 is fixed to the spring cover 34, and the outside end in the spiral winding direction of the spiral spring 36 is connected to the leg plate 18 (the frame 12) via the spring seat 38 and the spring cover 34. Furthermore, an adapter 40 is provided in the vicinity of the inside end in the spiral winding direction of the spiral spring 36. The inside end in the spiral winding direction of the spiral spring 36 is fixed to an outside peripheral portion of the adapter 40. Furthermore, the leg plate 18 side end portion of the torsion shaft 32 is fitted into, and fixed to, the axial portion of the adapter 40.

A pretensioner 42 is provided at the outside of the leg plate 16. The pretensioner 42 is provided with a cylinder 44. A gas generator 46 is mounted to the cylinder 44 at a bottom side portion thereof, and when a non illustrated acceleration sensor detects that a vehicle is in a state of suddenly decreasing velocity, gas generating agent provided in an internal portion of the gas generator 46 is ignited. By this action, the gas generating agent burns in an extremely short period of time and instantaneously generates gas. Gas generated in this way is supplied into the cylinder 44 and rapidly raises the internal pressure of the cylinder 44. Due to the internal pressure of the cylinder 44 rapidly rising, a piston 48 that is accommodated in the cylinder 44 slides within the cylinder 44. A rack bar 50 is formed at the piston 48, and the rack bar 50 slides with the movement of the piston 48 that accompanies the rise in the internal pressure of the cylinder 44.

Also, a gear case 52 is provided at the vicinity of the opening side of the cylinder 44 on the leg plate 16 side, and a cover plate 54 is provided on the opposite side of the cylinder 44, so as to be able to cover the rack bar 50, which has protruded from the cylinder 44, and so as to retain the cylinder 44 in a state of being fixed to the leg plate 16 by screws. Furthermore, a pinion 56 is disposed between the cover plate 54 and the gear case 52. The structure is such that the pinion 56 is meshed with the rack teeth of the distal end side of the rack bar 50, and the pinion 56 is also axially rotatably supported by the other end of the torsion shaft 32 that penetrates through the leg plate 16 and the gear case 52, and when the rack bar 50 moves upward the pinion 56 rotates in the take up direction.

Also, a clutch 58 is provided on the leg plate 16 side end of the pinion 56. The clutch 58 is rotatably axially supported by the torsion shaft 32, and, therefore, even when the torsion shaft 32 rotates the clutch 58 does not rotate. However, the clutch 58 is engaged with the pinion 56 and so when the pinion 56 rotates in the take up direction, a portion of the clutch 58 deforms and is connected to the torsion shaft 32.

Also, a lock mechanism 60 is provided on the side of the leg plate 16. The lock mechanism 60 is provided with a sensor holder 62. The sensor holder 62 is formed with a recessed shape that is partially open facing toward the leg plate 16 side, and the sensor holder 62 is fixed to the leg plate 16. Furthermore, a portion of the cover plate 54 is located to the inside of the portion opening toward the leg plate 16 side. A sensor cover 64 is provided on the side of the sensor holder 62 that is opposite to the side of the leg plate 16. The sensor cover 64 has fixing claws or the like provided at outer peripheral portions thereof, and these fit together with predetermined positions of the sensor holder 62 and the sensor cover 64 is mechanically connected to the sensor holder 62.

A non illustrated cylindrical shaft receiving portion is formed on the sensor cover 64, rotatably axially supporting a portion at the other end of the torsion shaft 32 that has passed through the sensor holder 62. A V gear 66 is provided, serving as a rotating body, between the sensor holder 62 and the sensor cover 64. The V gear 66 is formed with a shallow bottomed cylindrical shape (or saucer shape) opening facing toward the sensor cover 64 side, and ratchet teeth are formed at an outer peripheral portion on the V gear 66. The torsion shaft 32 passes through the V gear 66, and the V gear 66 is attached to the torsion shaft 32 such that it is able to rotate coaxially and integrally with the torsion shaft 32.

Figure 1:
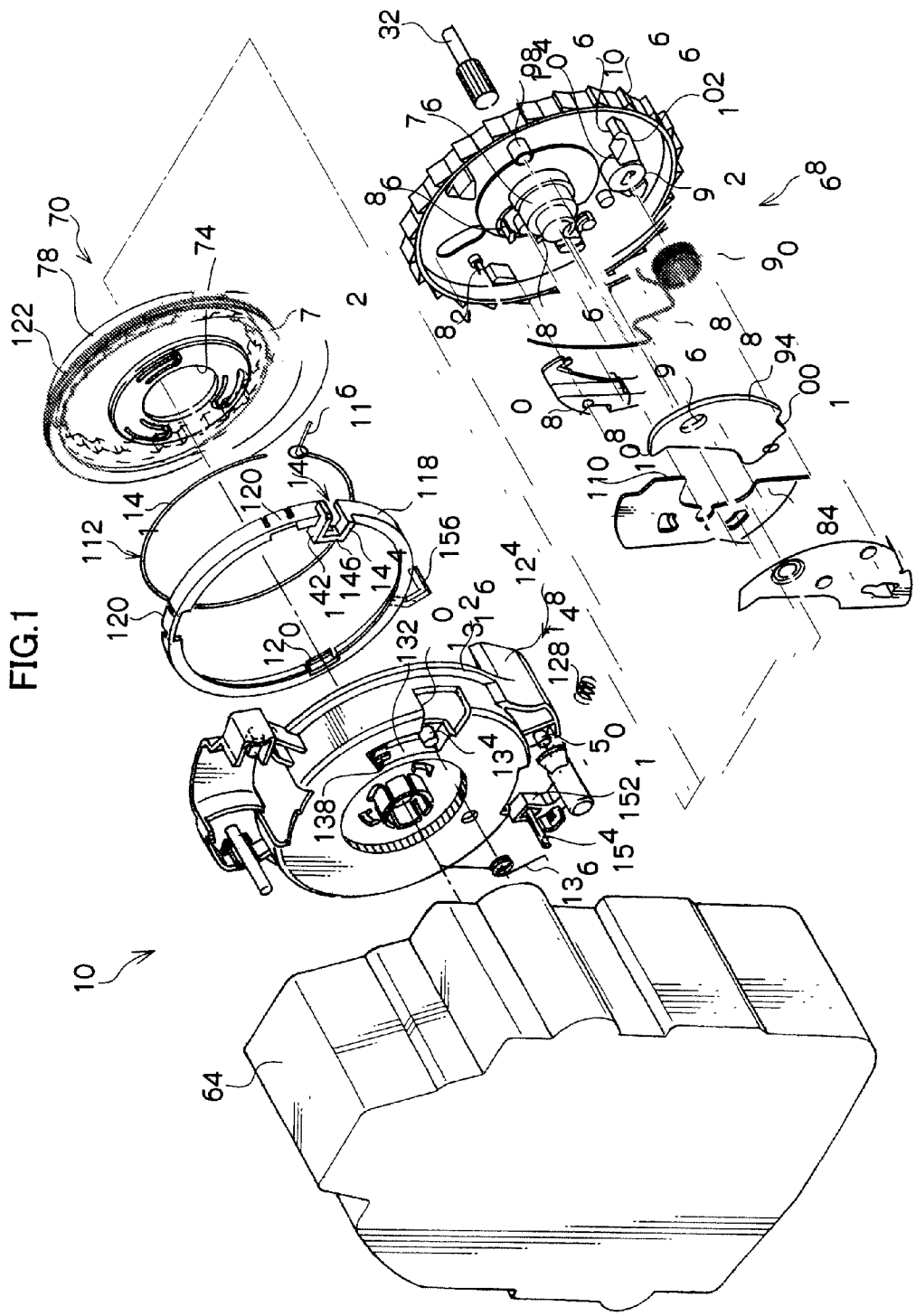
FIG. 1 is an exploded perspective view showing a configuration of a webbing retracting device according to a first exemplary embodiment of the present invention.

Here, the configuration between the V gear 66 and the sensor cover 64 of FIG. 2 is shown in FIG. 1. As shown in FIG. 1, a rotation detection mechanism 68 is provided on the inside of the V gear 66. The rotation detection mechanism 68 is provided with a gear ring 70. A low wall 72 that is circular shaped when viewed from the front is provided to the gear ring 70. A circular hole 74 is formed at the low wall 72, concentric to the outer peripheral portion thereof. An axial portion 76 that is formed at the V gear 66 is passed through at the circular hole 74, and the gear ring 70 is axially supported rotatably at the axial portion 76. Furthermore, a ring shaped gear portion 78, formed with internal ratchet teeth at an inner peripheral portion thereof, is formed coaxially and integrally to the low wall 72, at the face of the low wall 72 on the leg plate 16 side.

A W pawl 80 is provided at the inside of the gear ring 70, to correspond to the ratchet teeth of the gear portion 78. The W pawl 80 is axially supported by a pin 82 formed on the V gear 66 at a position displaced relative to the axial center of the torsion shaft 32 so that the W pawl 80 is able to swing around an axis parallel to the torsion shaft 32. The structure is such that the W pawl 80, by the swinging movement thereof, contacts or moves away from the inner peripheral portion of the gear portion 78, and by one end of the W pawl 80 moving to approach the proximity of the inner peripheral portion of the gear portion 78, the W pawl 80 meshes with the ratchet teeth formed on the inner peripheral portion of the gear ring 70. In this meshed state, if the V gear 66 is rotating in the pull out direction then the rotation force of the V gear 66 in the pull out direction is transmitted through the W pawl 80 to the gear ring 70, and the gear ring 70 is rotated in the pull out direction.

Also, an inertial mass 84, serving as a rotation detection member, is provided at the side of W pawl 80 in the radial direction of the gear ring 70. The inertial mass 84 is supported by a pair of retention portions 86 that are formed on the V gear 66, such that the inertial mass 84 is able to swing within a predetermined range substantially along the circumferential direction of the V gear 66, and it is structured such that the inertial mass 84 that has been swung in the lock activation direction, which is one of the circumferential directions of the V gear 66, presses the W pawl 80, swings the W pawl 80, and meshes the W pawl 80 with the inner peripheral portion of the gear portion 78.

Furthermore, one end of a return spring 88 is anchored to the inertial mass 84. The return spring 88 is provided with a fixing portion 90 formed into a coil-shaped. The fixing portion 90 is anchored to a fixing pin 92 formed on the V gear 66. The return spring 88 is a spiral coil spring with one end side thereof suitably bent, biasing the inertial mass 84 in a swing direction that is the opposite direction to the direction of swing of the inertial mass 84 when pressing the W pawl 80 and swinging the W pawl 80 (this being the lock activation direction).

Furthermore, a restriction weight 94, serving as a restriction unit, is provided at the opposite side of the inertial mass 84 to that of the W pawl 80. The restriction weight 94 is provided such that the position of the center of gravity thereof is displaced in a rotational radial direction to the outside from the axial center of the spool 20 (the center of rotation), (or in other words, it is preferable to set the position of the center of gravity of the restriction weight 94 as far from the axial center of the spool 20 as possible). An elongated hole 96 is formed in the restriction weight 94. The elongated hole 96 is intruded into by a circular column shaped support pin 98 that is formed on the V gear 66. The internal width dimension of the elongated hole 96 is just slightly greater than the external diameter of the support pin 98, and, therefore, the restriction weight 94 is rotatable about the support pin 98, and also restriction weight 94 is able to slide in the radial direction of the V gear 66 up to the point when the support pin 98 contacts with the end portions in the length direction of the elongated hole 96.

There is also a contact surface (an abut surface) 100 formed on the restriction weight 94. There is an engagement block 102, serving as a prevention member, formed on the V gear 66 to correspond to the contact surface 100. A portion of the outer periphery of the engagement block 102 is an engagement surface 104, and when the above support pin 98 is in the state of being positioned to one end in the length direction of the elongated hole 96 the restriction weight 94 that is in a specific rotation position about the support pin 98 is in a non contacting position to the inertial mass 84, and the contact surface 100 contacts with the engagement surface 104. In such a contact state of the contact surface 100 to the engagement surface 104, rotation of the restriction weight 94 in one of the directions about the support pin 98 is prevented.

However, if the restriction weight 94 slides up to a position where the support pin 98 is positioned at the other end in the longitudinal direction of the elongated hole 96, the opposing state of the contact surface 100 and the engagement surface 104 is eliminated, and the restriction weight 94 is able to rotate in the one direction about the support pin 98 up to where the restriction weight 94 attains a contact position where the contact surface 100 is positioned in the vicinity of an engagement surface 106 formed on the engagement block 102 to the outside in the radial direction of the V gear 66 from the engagement surface 104.

An interfering portion 108 is also formed on the restriction weight 94. When the restriction weight 94 has attained the above contact position, the interfering portion 108 is able to contact with a contact portion 110 that is formed on the restriction weight 94 side of the inertial mass 84. In this state, if the inertial mass 84 attempts to swing in the lock activation direction then the interfering portion 108 contacts the contact portion 110 and interferes therewith, and restricts swinging of the inertial mass 84 in the lock activation direction. Furthermore, the end of the return spring 88 which is on the opposite side of the fixing portion 90 to the end described above, is anchored at the restriction weight 94, biasing the restriction weight 94 about the support pin 98 toward the other side, and biasing the restriction weight 94 toward the position where the support pin 98 is positioned to one end in the longitudinal direction of the elongated hole 96.

There is a friction spring 112, serving as an engaging member, provided on the gear ring 70. The friction spring 112 is provided with a body 114. The body 114 is basically a ring shape, but has a portion that is not continuous at one location in the circumferential direction, thereby being substantially a C-shape. The internal diameter dimension of the body 114 is formed to be about the same as, or slightly smaller than, the external diameter dimension of the gear ring 70, and the body 114 is fitted over an outer peripheral portion of the gear ring 70, against the spring force of the body 114. The body 114 is able to rotate coaxially relative to the gear ring 70, but presses the outer peripheral portion of the gear ring 70 due to its own spring force, and, unless an external force acts on the friction spring 112 to hinder rotation thereof, the body 114 (friction spring 112) rotates integrally with the gear ring 70. Furthermore, there is a pressing portion 116 extending outside in the radial direction of the body 114 from one end thereof in the circumferential direction.

Also, there is a substantially ring-shaped friction ring 118 mounted to an outer peripheral portion of the gear ring 70. The friction ring 118 is formed with an internal diameter dimension that is larger than the external diameter dimension of the gear ring 70. There is one, or plural (three in the present exemplary embodiment), engagement claw(s) 120 formed at predetermined intervals around the circumferential direction of the friction ring 118. Annular engagement grooves 122 are formed to the low wall 72, corresponding to these engagement claws 120 and formed to be continuous in at least a predetermined region along an outer peripheral portion of the low wall 72. The engagement claws 120 fit into the annular engagement grooves 122, and the engagement claws 120, and therefore the friction ring 118, are able to relatively rotate coaxially with respect to the gear ring 70 within the confines of the annular engagement grooves 122 formed along the outer peripheral portion of the low wall 72.

In the state in which the friction ring 118 is mounted to the outer peripheral portion of the low wall 72 of the gear ring 70, there is a space, formed between the outer peripheral portion of the gear ring 70 and the internal peripheral portion of the friction ring 118, that provides a separation that is the same as, or greater than, the thickness of the friction spring 112, and body 114 of the friction spring 112 is accommodated within this space.

There is a sensor gear 124 provided at the sensor cover 64 side of the V gear 66. The sensor gear 124 is provided with a body 126. The torsion shaft 32 passes through, coaxial to the body 126, and the body 126 is rotatably axially supported by the torsion shaft 32. One end of a return spring 128 is anchored to a portion of the sensor gear 124. The return spring 128 is a tension coil spring, and the other end of the return spring 128 is anchored to the sensor cover 64, biasing the sensor gear 124 in the take up direction when the sensor gear 124 has been rotated in the pull out direction around the torsion shaft 32.

There is a window portion 130 formed in the body 126 of the sensor gear 124. The window portion 130 passes through at a portion of the body 126 in the spool 20 axial direction and radial direction. There is a spring seat 132 provided at the inside of the window portion 130. The spring seat 132 is provided integrally to the sensor gear 124, in a state of being displaced further to the V gear 66 side of the sensor gear 124 than the end face on the sensor cover 64 side of the body 126. A circular column shaped boss 134 is formed so as to protrude toward the sensor cover 64 side from the spring seat 132, and a coil portion of a spiral coil spring 136 is fitted over the boss 134. One end of the spiral coil spring 136 is anchored to an anchor portion 138 provided on the spring seat 132.

In contrast, the other end of the spiral coil spring 136 extends in the direction toward the side of the spring seat 132. A portion in the circumferential direction of the main body of the above friction ring 118 is cut-away, corresponding to the other end of the spiral coil spring 136. An housing portion 140 is provided at this cut-away portion. The housing portion 140 is provided with a pair of side walls 142,144 that mutually oppose each other along the circumferential direction of the friction ring 118. These side walls 142,144 are connected together on the inside thereof in the radial direction of the friction ring 118 by a peripheral wall 146, therefore there is a recessed shaped portion formed that is open facing to the outside in the radial direction of the friction ring 118. The other end of the spiral coil spring 136, on the V gear 66 of the peripheral wall 146, and the pressing portion 116 intrude into the housing portion 140.

A long pressing portion 148 is formed at the body 126 of the sensor gear 124 facing toward the V gear 66 side. A shaft 150 is formed to protrude from an end portion at the other side of the pressing portion 148 to the side of the V gear 66, and an interlocking pawl 152 is axially supported by the pressing portion 148 so as to be able to pivot around an axis that is parallel to (in the same direction as) the axial direction of the torsion shaft 32. The interlocking pawl 152, by pivoting, contacts or moves away from the above outer peripheral portion of the V gear 66, and in the state in which the interlocking pawl 152 approaches and engages with the outer peripheral portion of the V gear 66, if the V gear 66 is rotated in the pull out direction, the rotation of the V gear 66 in the pull out direction is transmitted to the sensor gear 124 through the interlocking pawl 152, and the sensor gear 124 rotates with the V gear 66 in the pull out direction.

There is an engaging pin 154 formed to protrude from the face of the interlocking pawl 152 on the sensor cover 64 side. There is a pressing portion 156, protruding to the outside in the radial direction from an outer peripheral portion of the above friction ring 118 and corresponding to the engaging pin 154. The pressing portion 156 is bent around, at a middle portion in the longitudinal direction thereof, toward the V gear 66 side. The distal end side of the pressing portion 156 from the bent portion in longitudinal direction middle portion of the pressing portion 156, faces the engaging pin 154 along the rotation circumferential direction of the gear ring 70, and when the friction ring 118 rotates in the pull out direction and the pressing portion 156 engages with the engaging pin 154, the pressing portion 156 pushes up the interlocking pawl 152, through the engaging pin 154, and the interlocking pawl 152 meshes with the V gear 66.

Furthermore, an acceleration sensor 158 is provided below the interlocking pawl 152, as shown in FIG. 2. There is a case shaped housing portion 160 formed on the sensor holder 62 corresponding to the acceleration sensor 158, the housing portion 160 being open to the sensor cover 64 side, and at least a portion of the acceleration sensor 158 is accommodated in the housing portion 160. The acceleration sensor 158 is provided with a base 162. The base 162 is formed overall in a flat plate shape, with the thickness direction thereof in the vertical direction. There is a curved surface formed on the top face of the base 162, the curved surface opening toward the top, and a hard ball 164, serving as an inertial body, is disposed on top of the curved surface. A sensor pawl 166 is provided above the hard ball 164.

The sensor pawl 166 is pivotally axially supported at the top edge of a vertical wall 168 that extends upward from one portion of the outer periphery of the base 162, and the sensor pawl 166 is pushed upwards by the hard ball 164 rolling on the curved surface of the base 162. By the sensor pawl 166 being pushed up by the hard ball 164 the sensor pawl 166 contacts with the interlocking pawl 152 shown in FIG. 1 and pivots the interlocking pawl 152 so as to push it upwards. At the pivoting side of the interlocking pawl 152, which has been pivoted by the engagement with the sensor pawl 166, is disposed the above described V gear 66, and due to this the interlocking pawl 152 meshes with the V gear 66.

The lock mechanism 60, as shown in FIG. 2, is provided with a lock pawl 170, serving as a lock member. The lock pawl 170 is provided with a pair of shafts 172. The axial direction of the shafts 172 is a direction parallel to (in the same direction as) the axial direction of the spool 20, and one of the shafts 172 is pivotally axially supported in a shaft receiving hole (omitted in the figure) formed in the leg plate 18, and the other of the shafts 172 is pivotally axially supported in a shaft receiving hole 174 formed in the gear case 52. There is a pawl portion 176 formed on one of the shafts 172.

The pawl portion 176 is a plate shaped member that has a thickness direction that is in the axial direction of the shaft 172, and ratchet teeth are formed on a portion of the outer periphery of the pawl portion 176. A lock base 178 is provided at the side of the pawl portion 176 that is along the pivoting radial direction of the shaft 172. The lock base 178 is provided with an insertion fit portion 180. The insertion fit portion 180 is formed in a circular column shape, and fits into a portion at the corresponding end of the through hole 24 of the spool 20 so as to be rotatable coaxially relative to the spool 20.

The insertion portion 180, and consequently the lock base 178, is passed through coaxially in a rotation fixed state by the torsion shaft 32, and rotates integrally and coaxially with respect to the torsion shaft 32. A ratchet portion 182 is formed integrally to the insertion portion 180 at the leg plate 16 side thereof. The ratchet portion 182 is formed to be coaxial with respect to the insertion portion 180, and there are ratchet teeth formed intermittently on a portion of the outer periphery of the ratchet portion 182.

In the above lock pawl 170, the ratchet teeth of the pawl portion 176 mesh with the ratchet teeth of the ratchet portion 182 by the pivoting of the shaft 172 in the take up direction. In the meshed state of the pawl portion 176 with the ratchet portion 182, the rotation of the ratchet portion 182, and consequently the rotation of the lock base 178, is restricted in the pull out direction. The structure is such that the pressing portion 148 of the sensor gear 124 shown in FIG. 1 corresponds with the pawl portion 176, and when the body 126 of the sensor gear 124 rotates in the pull out direction, the pressing portion 148 presses the pawl portion 176, and the lock pawl 170 is pivoted in the take up direction.

Operation and Effect of the First Exemplary Embodiment

Next, explanation will be given of the operation and the effect of the present webbing retracting device 10.

In the present webbing retracting device 10, when, in the state in which the webbing belt 26 is taken up on the spool 20, the webbing belt 26 is pulled to the distal end side against the biasing of the spiral spring 36, then as the webbing belt 26 is gradually pulled out the spool 20 rotates in the pull out direction.

In such a manner the pulled out webbing belt 26 is placed around the body of an occupant and, for example, by retaining a tongue plate provided in an intermediate portion in the lengthwise direction of the webbing belt 26 in a buckle device provided at the side of a vehicle seat, the fastened state is arrived at in which the body of the occupant wears the webbing belt 26, and the body of an occupant is restricted by the webbing belt 26. In such a state in which the webbing belt 26 is fastened, when a vehicle is in a state of rapid deceleration, the hard ball 164 consequently rolls, and the sensor pawl 166 is pushed up by the hard ball 164. The sensor pawl 166 pushed up in such a manner, engages with the interlocking pawl 152 of the sensor gear 124, so as to push up the interlocking pawl 152. In so doing the interlocking pawl 152 meshes with the V gear 66.

When the body of an occupant moves in a direction substantially toward the front of the vehicle, by the inertia as the vehicle decelerates, the webbing belt 26 is suddenly pulled by the body of the occupant. In this manner, by the webbing belt 26 being suddenly pulled, rotational force is suddenly applied to the spool 20 in the pull out direction. In principle, by the spool 20 rotating in the pull out direction, the torsion shaft 32, and consequently the V gear 66, rotates in the pull out direction, and W pawl 80 and the inertial mass 84 rotate with the V gear 66 in the pull out direction.

Figure 3:
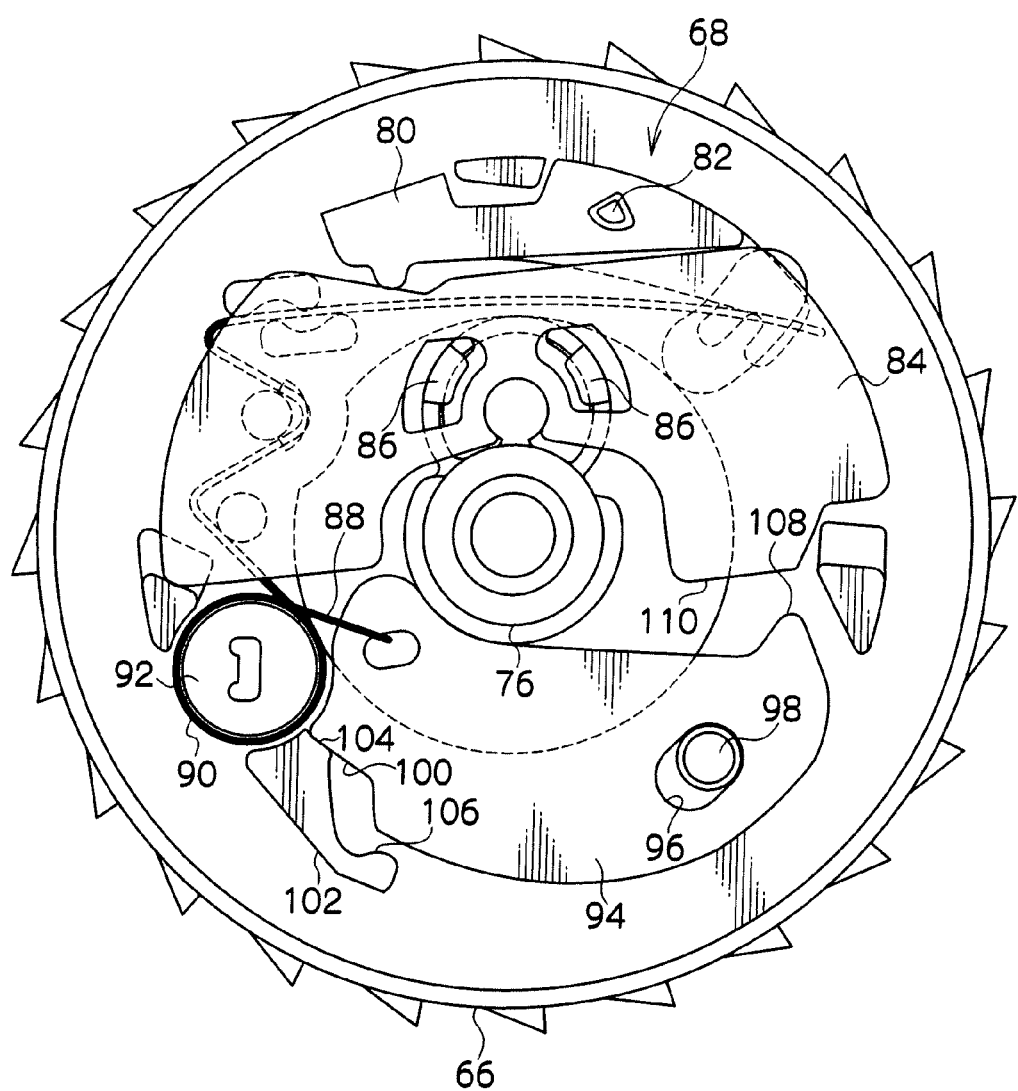
FIG. 3 is a front view of a rotational body, a rotation detection member, a restriction unit, and a prevention member in a webbing retracting device according to the first exemplary embodiment of the present invention.
Figure 4:
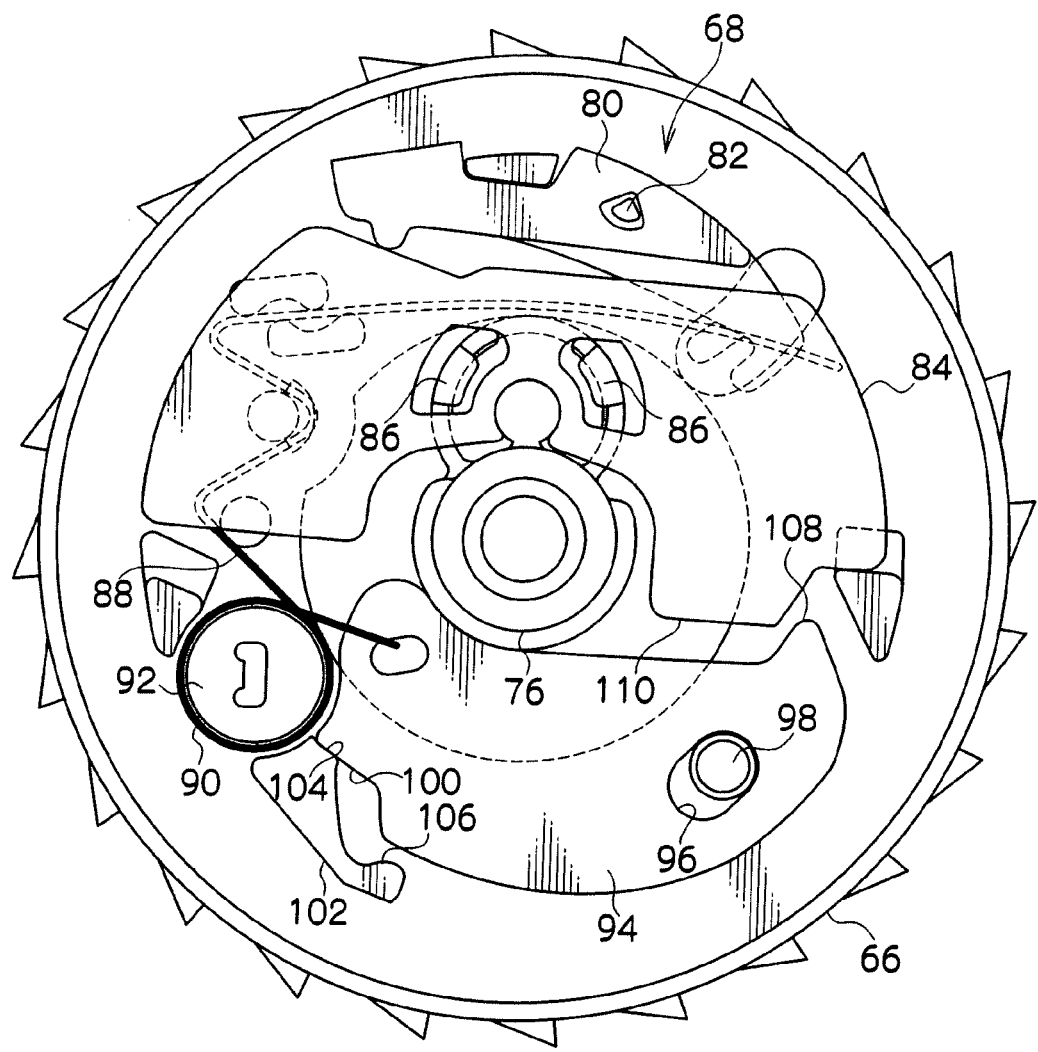
FIG. 4 is a front view, corresponding to FIG. 3, showing a state in which a rotation detection member is displaced in the lock activation direction in a webbing retracting device according to the first exemplary embodiment of the present invention.

However, when the spool 20 is rotated suddenly in the pull out direction, as above, the inertial mass 84 does not rotate and attempts to maintain its position, due to inertia, and by doing so, the inertial mass 84 relatively swings with respect to the V gear 66 against the biasing force of the return spring 88. When the inertial mass 84 swings relative to the V gear 66, from the state shown in FIG. 3, the inertial mass 84 presses the W pawl 80 and swings the W pawl 80, and in doing so, as shown in FIG. 4, one end of the W pawl 80 is moved into the vicinity of an inner peripheral portion of the gear ring 70, and meshes with the ratchet teeth formed on an inner peripheral portion of the gear ring 70.

By the meshing of the W pawl 80 with the gear ring 70, the rotational force of the spool 20 is transmitted through the torsion shaft 32, the V gear 66 and the W pawl 80 to the gear ring 70, and the gear ring 70 together with the V gear 66 rotates in the pull out direction. By rotation of the gear ring 70 in the pull out direction, the friction spring 112 that is pressed by a biasing force against the outer peripheral portion of the gear ring 70 rotates in the pull out direction with the gear ring 70.

In doing so, when the friction spring 112 rotates by a predetermined rotational angle in the pull out direction, the pressing portion 116 presses the side wall 142 and rotates the friction ring 118 in the pull out direction. By rotation of the friction ring 118 in the pull out direction, the pressing portion 156 of the friction ring 118 approaches the vicinity of the engaging pin 154, presses the engaging pin 154, and pushes up the interlocking pawl 152. In doing so the interlocking pawl 152 meshes with the V gear 66.

When the interlocking pawl 152 meshes with the V gear 66, as described above, the rotational force of the spool 20 in the pull out direction is transmitted through the torsion shaft 32, the V gear 66 and the interlocking pawl 152 to the sensor gear 124, and due to this the sensor gear 124 is rotated in the pull out direction.

When the sensor gear 124 rotates by a certain angle in the pull out direction against the biasing force of the return spring 88, the pressing portion 148 provided on the sensor gear 124 presses the pawl portion 176 of the lock pawl 170, and the pawl portion 176 is pivoted about the shaft 172. When the pawl portion 176 pivots in such a manner about the shaft 172, the pawl portion 176 meshes with the ratchet portion 182 of the lock base 178, and rotation of the lock base 178, and consequently of the spool 20, is restricted in the pull out direction. Due to this, the body of an occupant, which is trying to inertially move in a direction that is substantially the forward direction of the vehicle, may be held, restricted with certainty.

When the insertion through hole 22 in the state in which the webbing belt 26 is pulled out, is rotated in the take up direction by the biasing force of the spiral spring 36, the webbing belt 26 is taken up and accommodated on an outer peripheral portion of the insertion through hole 22 from base end side in the longitudinal direction of the webbing belt 26. Here, the insertion through hole 22 initiates rotation in this manner in the take up direction, and the V gear 66 follows the rotation of the insertion through hole 22 and initiates rotation in the take up direction. When the V gear 66 rotates in the take up direction above a predetermined acceleration (rotational angular acceleration), rotation lag occurs of the restriction weight 94 in the take up direction relative to the V gear 66 due to inertia, and the restriction weight 94 attempts to rotate in the pull out direction relative to the V gear 66 against the biasing force of the return spring 88. In doing so, the restriction weight 94 slides up to the point where the support pin 98 changes a position from a position at one end in the longitudinal direction of the elongated hole 96 to a position at the other end thereof. By the sliding of the restriction weight 94 in such a manner, the opposing state of the contact surface 100 to the engagement surface 104 is eliminated.

Figure 5:
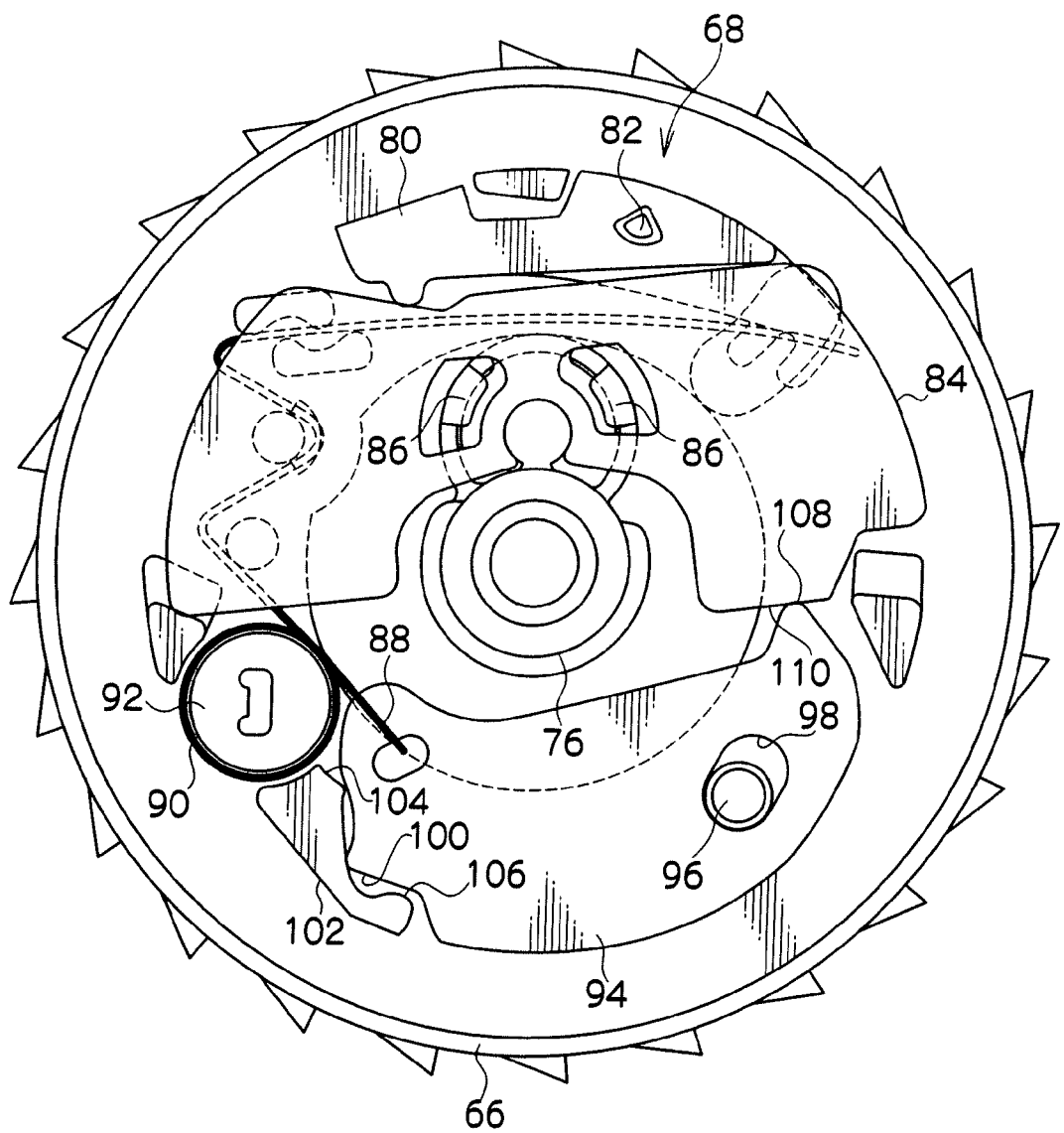
FIG. 5 is a front view, corresponding to FIG. 3, showing a state in which displacement of the rotation detection member in the lock activation direction is restricted by a restriction unit in a webbing retracting device according to the first exemplary embodiment of the present invention.

Furthermore, since the position of the center of gravity of the restriction weight 94 is distanced from the axial center of the spool 20, and consequently from the axial center of the V gear 66 (center of rotation), the restriction weight 94 is sensitive to rotation of the V gear 66 and reacts thereto by attempting to fly out toward the outside in the rotational radial direction of the V gear 66. Therefore, the opposing state of the contact surface 100 to the engagement surface 104 has been eliminated, and, when furthermore the V gear 66 rotates in the take up direction, due to this centrifugal force, a portion of the restriction weight 94 that is to the take up direction side with respect to the support pin 98 moves toward the outside in the rotation radial direction of the V gear 66. In doing so, as shown in FIG. 5, the restriction weight 94 pivots about the support pin 98 up to a position in which the contact surface 100 is in the vicinity of the engagement surface 106, and attains a contact position. In this way, by the pivoting of the restriction weight 94, the interfering portion 108 approaches the contact portion 110 of the inertial mass 84.

In the state in which the insertion through hole 22 is rotating in the take up direction, the restriction weight 94 is maintained in the contact position by the centrifugal force of the V gear 66. When the taking up of the webbing belt 26 is completed by the insertion through hole 22, let us suppose that as a reaction to the completion of take up the insertion through hole 22 is suddenly rotated, by a slight amount, in the pull out direction. In such a case, it is possible for the V gear 66, as well as the insertion through hole 22, to be suddenly rotated, by a slight amount, in the pull out direction.

In such a case, acceleration occurs in the pull out direction on the V gear 66, in the opposite direction to the direction up to now, and along with this, the restriction weight 94 attempts to move in the take up direction relative to the V gear 66. However, in a state of the restriction weight 94 being positioned at an arrived position, the side end portion of the restriction weight 94 that is to the side that is further in the take up direction than the contact surface 100 is in contact with the engagement block 102, preventing movement of the restriction weight 94 in the take up direction or in a direction that includes the take up direction, and the restriction weight 94 is maintained in state of being in the position that has been arrived at.

Furthermore, as described previously, when a great degree of acceleration occurs at the V gear 66 in the pull out direction, rotational lag occurs in the inertial mass 84 that attempts to maintain its position due to inertia, and the inertial mass 84 hence swings in the take up direction relative to the V gear 66. Here, when the inertial mass 84 swings, as described above, the inertial mass 84 pushes the W pawl 80 up, and thereby the W pawl 80 meshes with the ratchet teeth at an inner peripheral portion of the gear portion 78.

However, in the state, in the current arrived at state, if the inertial mass 84 attempts to swing, the interfering portion 108 is in contact with the contact portion 110, and swinging of the inertial mass 84 is restricted. Therefore, in this case, the inertial mass 84 does not push up the W pawl 80, and the W pawl 80 does not mesh with the ratchet teeth of an inner peripheral portion of the gear portion 78.

In this way, in the present webbing retracting device 10, when taking up of the webbing belt 26 by the insertion through hole 22 is completed, it is effectively prevented that the W pawl 80 meshes with the ratchet teeth of the gear portion 78, and as a result, a so-called "end-lock state" of the webbing retracting device 10 occurs.

Furthermore, as described above, after the swinging of the inertial mass 84 has been restricted, the restriction weight 94 rotates in the take up direction around the support pin 98 due to the biasing force of the return spring 88, and also the restriction weight 94 slides up to the position such that the support pin 98 is at one end in the longitudinal direction of the elongated hole 96, and in doing so, the restriction weight 94 returns to a non contact position with the inertial mass 84. In this way, by the restriction weight 94 returning to a non contact position, restriction, of the swinging of the inertial mass 84, is released.

In this manner, in the state in which the restriction weight 94 is in a non contact position, if the V gear 66 suddenly rotates in the pull out direction, centrifugal force also acts on the restriction weight 94. However, even if the V gear 66 rotates suddenly in the pull out direction, the restriction weight 94 is not able to slide in such a way that the position of the support pin 98 changes from one end in the longitudinal direction of the elongated hole 96 to the other end thereof. Therefore, in such a case, the opposing state of the contact surface 100 with the engagement surface 104 is not eliminated, and when the restriction weight 94 attempts to pivot about the support pin 98, the engagement surface 104 contacts with the contact surface 100, and pivoting of the restriction weight 94 is prevented. In this way, even if there is sudden rotation of the V gear 66, if that rotation is in the pull out direction, the restriction weight 94 is not able to move from the non contact position to the arrived position. Therefore, in this state, it is not possible that the interfering portion 108 contacts with the contact portion 110 and there is restriction of swinging of the inertial mass 84.

That is to say, in the present webbing retracting device 10, without impeding the function of locking the insertion through hole 22 when there is rapid deceleration, the webbing retracting device 10 such as the above can prevent an "end-lock state".

Also, since the present webbing retracting device 10 is configured to actuate the mechanism to prevent entering into an end-lock state by using the rotational force of the V gear 66 and centrifugal force, the mechanism for preventing end-lock may be made compact.

Furthermore, in the present webbing retracting device 10, each of the components of the mechanism to prevent entering into an end-lock state are all attached to the V gear 66 inside the gear portion 78. Therefore, even though the above superior effect may be achieved, the webbing retracting device 10 is prevented from increasing in size and it may be extremely effectively restricted.

Further, in the present webbing retracting device 10, as described above, since it is configured such that the W pawl 80 and the fixing portion 90 are both biased by the return spring 88, the number of components may be reduced when compared with a configuration in which the W pawl 80 and the restriction weight 94 are each biased by separate biasing member. Along with this reduction there is a reduction in the number of component assembly processes. In doing so, a reduction in cost may be achieved and also a large contribution may be made to prevention or suppression of an increase in size of the present webbing retracting device 10.

Second Exemplary Embodiment

Configuration of the Second Exemplary Embodiment

Figure 6:
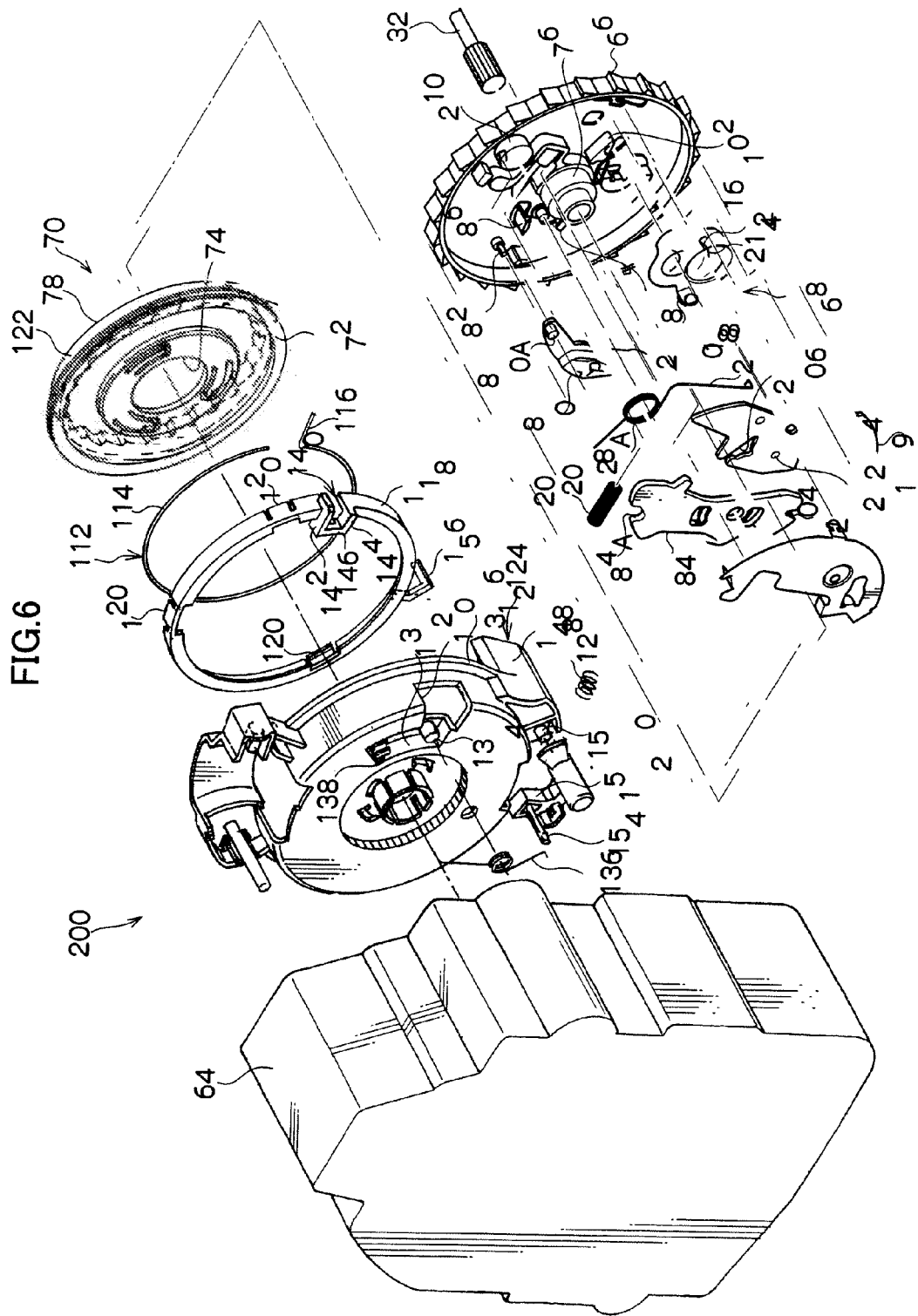
FIG. 6 is an exploded perspective view showing a configuration of relevant portions of a webbing retracting device according to a second exemplary embodiment of the present invention.
Figure 7:
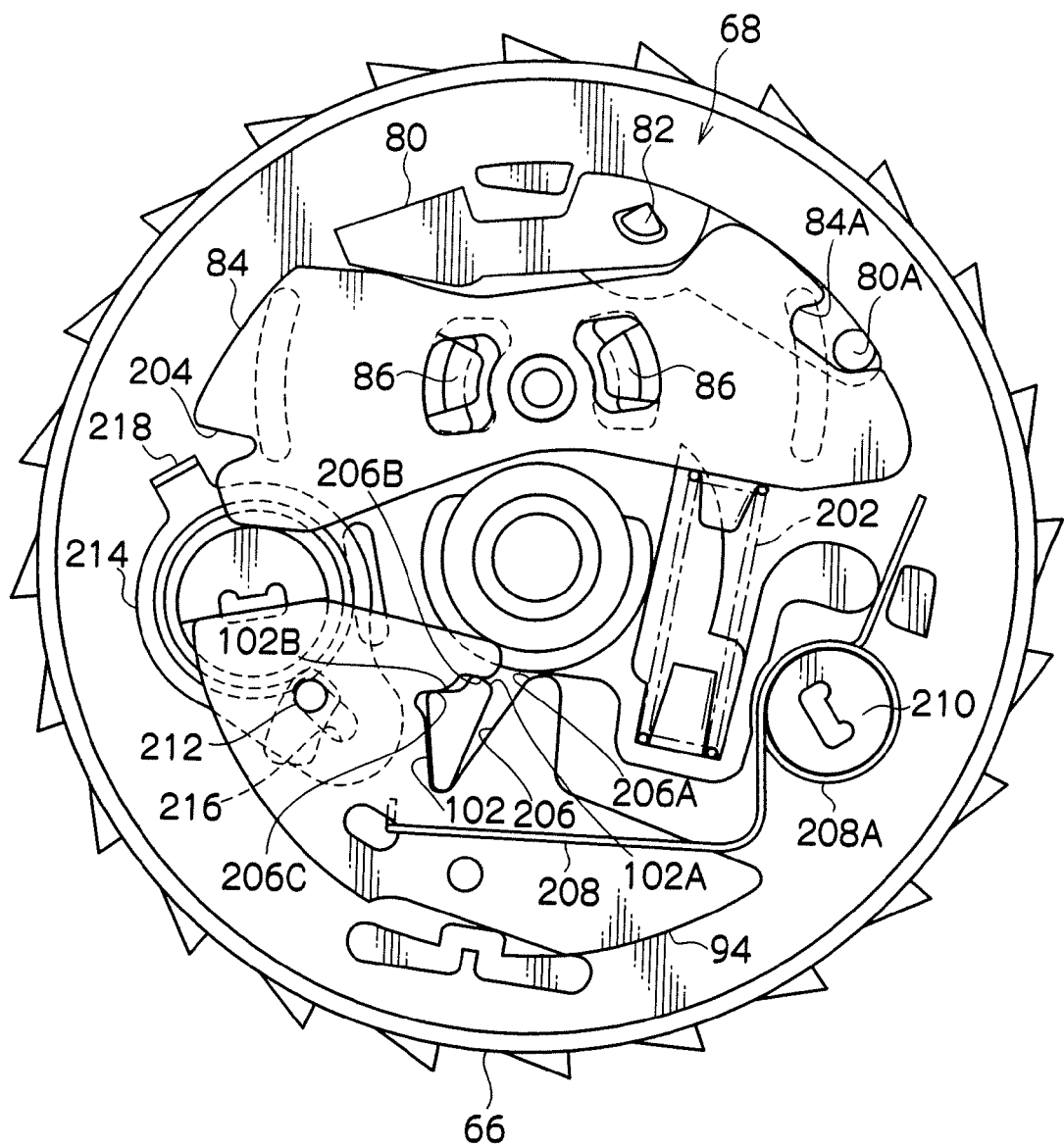
FIG. 7 is a front view of a rotational body, a rotation detection member, a restriction unit, and a prevention member in a webbing retracting device according to the second exemplary embodiment of the present invention.

In FIG. 6 a configuration of relevant portions of a webbing retracting device 200 according to a second exemplary embodiment of the present invention is shown through an exploded perspective view, and in FIG. 7 a configuration of relevant portions of the webbing retracting device 200 is shown through a front view.

The webbing retracting device 200 according to the present exemplary embodiment is substantially of the same configuration as the above first exemplary embodiment, but differs in the following points.

In the webbing retracting device 200, in the rotation detection mechanism 68, a circular column engagement pin 80A is integrally formed at the other end of the W pawl 80, and the engagement pin 80A projects from the W pawl 80 toward the opposite side to that of the V gear 66.

There is an engagement hole 84A formed through a outer peripheral portion of the inertial mass 84 at the take up direction side, and the engagement hole 84A is open to the outer periphery of the inertial mass 84, and is a elongated hole along the outer periphery of the inertial mass 84. The engagement pin 80A of the W pawl 80 inserts into the engagement hole 84A. When the W pawl 80 is swung by the inertial mass 84 swinging in the lock activation direction, the engagement pin 80A contacts with one end of the engagement hole 84A When the W pawl 80 is swung by the inertial mass 84 swinging in the direction opposite to the lock activation direction, the engagement pin 80A contacts with the other end of the engagement hole 84A. Therefore, the swinging range of the W pawl 80 and the swinging range of the inertial mass 84 is made to be a suitable range.

Instead of the return spring 88 in the above first exemplary embodiment, one end of a compression coil spring 202, serving as additional biasing member, is anchored to the inertial mass 84, and the other end of the compression coil spring 202 is anchored to the V gear 66. The compression coil spring 202 biases the inertial mass 84 in the direction that is opposite to the lock activation direction.

There is a triangular cross-section lock groove 204, serving as a portion to be restricted, formed through an outer peripheral portion of the inertial mass 84 on the pull out direction side, and the lock groove 204 is open to the outer periphery of the inertial mass 84.

The restriction weight 94 functions as a moving member configuring a restriction unit. There is no elongated hole 96 or contact surface 100 of the above first exemplary embodiment provided at the restriction weight 94, and there is no support pin 98 of the above first exemplary embodiment provided at the V gear 66.

There is a substantially triangular cross-section engagement groove 206, serving as an engagement portion, formed through the restriction weight 94, and there is, formed at the spool 20 axial center side of the engagement groove 206, an opening portion 206A that opens the engagement groove 206 to the outer periphery of the restriction weight 94, a first facing surface 206B that is on the take up direction side of the opening portion 206A, and a second facing surface 206C that is on the first facing surface 206B take up direction side, but further to the spool 20 outer peripheral side of than the first facing surface 206B.

Figure 9:
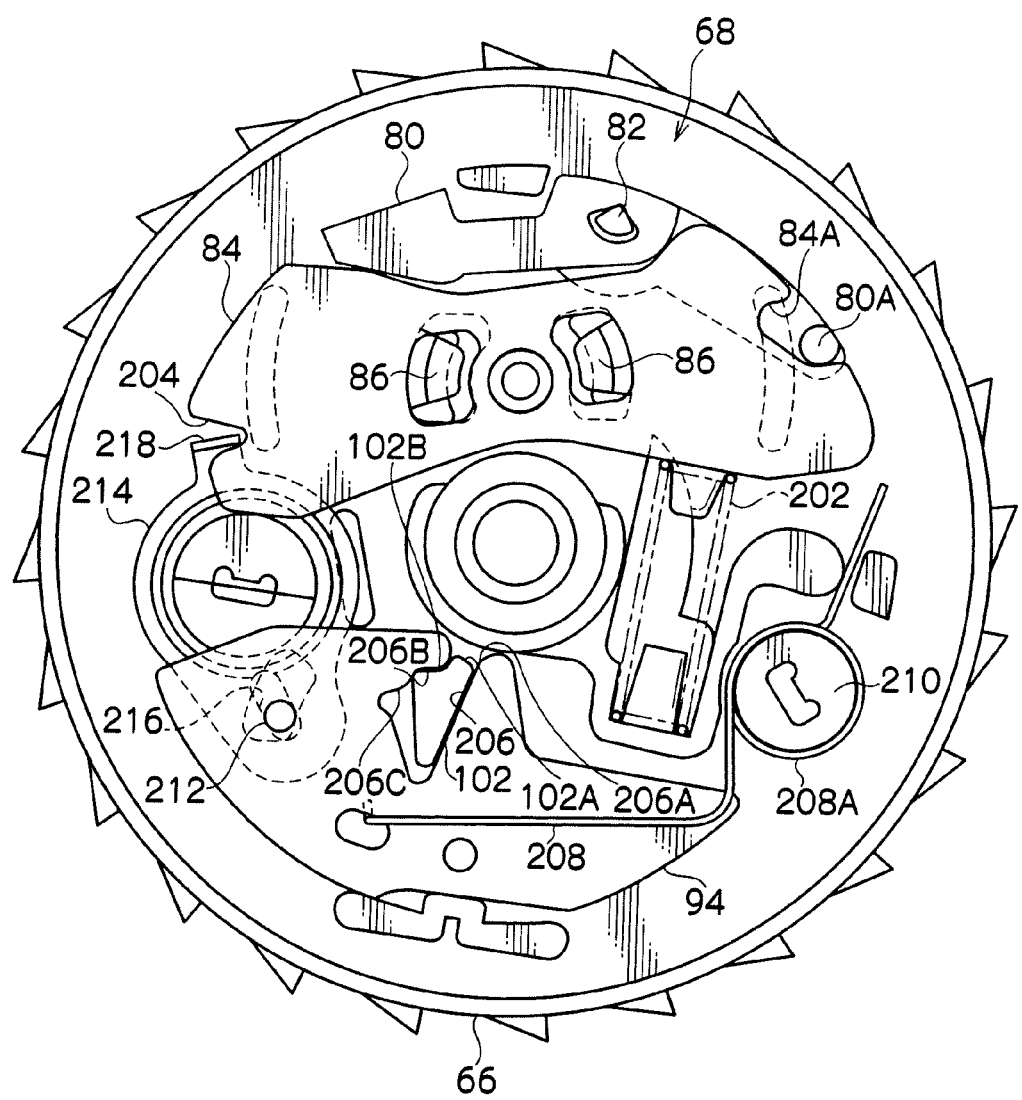
FIG. 9 is a front view, corresponding to FIG. 7, showing a state in which displacement of the rotation detection member in the lock activation direction is restricted by a restriction unit in a webbing retracting device according to the second exemplary embodiment of the present invention.

The engagement block 102 of the V gear 66 is substantially triangular in shape, and, on the spool 20 axial center side edge of the engagement block 102, there are formed a first engaging face 102A on the pull out direction side, and a second engaging face 102B that is at the take up direction side of the first engaging face 102A and more to the outer peripheral side of the spool 20 than the first engaging face 102A. The engagement block 102 is inserted within the engagement groove 206, and the restriction weight 94 is disposable in: a non contact portion when disposed to the spool 20 axial center side, in which the side face on the take up direction side of the engagement groove 206 is in contact with the side face on the take up direction side of the engagement block 102 (in the non contact position when the first facing surface 206B faces (engages) the first engaging face 102A then the second facing surface 206C also faces (engages) the second engaging face 102B); and, as shown in FIG. 9, a contact position when disposed to the spool 20 outer peripheral side in which the side face on the pull out direction side of the engagement groove 206 contacts the side face on the pull out direction side of the engagement block 102 (in the contact position the first engaging face 102A faces (intrudes into) the opening portion 206A, and also the first facing surface 206B faces (engages) the second engaging face 102B).

One end of a return spring 208, serving as a biasing member, is anchored to the restriction weight 94, and the return spring 208 is a spiral coil spring with a coil shaped fixing portion 208A formed thereon. The fixing portion 208A is anchored to a fixing pin 210 formed on the V gear 66, and the other end of the return spring 208 is anchored to the V gear 66. In doing so, the return spring 208 biases the restriction weight 94 from the contact position in the direction toward the non contact position, and the restriction weight 94 is disposed in the non contact position.

There is a circular shaft shaped rotation shaft 212 provided at a take up direction side edge portion of the restriction weight 94, and the rotation shaft 212 protrudes from the restriction weight 94 to the V gear 66 side thereof.

There is a substantially circular ring plate shaped lever 214, serving as a restriction member configuring the restriction unit, rotationally supported between a pull out direction side edge portion of the inertial mass 84 and a take up direction side edge portion of the restriction weight 94 at the V gear 66. A rotation hole 216 is formed through the lever 214 at a portion to the restriction weight 94 side thereof. The rotation hole 216 is a elongated hole, with the rotation shaft 212 of the restraint weight 94 passing therethrough, and the rotation shaft 212 is disposed to the inertial mass 84 end side of the rotation hole 216 when the restriction weight 94 is disposed in the non contact position, and the lever 214 is disposed in the non contact position. Furthermore, when the restriction weight 94 moves from the non contact position to the contact position, the rotation shaft 212 moves to the restriction weight 94 side end of the rotation hole 216, and by rotation of the lever 214 the lever 214 is disposed in the contact position (see FIG. 9).

A rectangular plate shaped hook 218, serving as a restriction portion, is integrally formed to an inertial mass 84 side portion of the lever 214, and the hook 218 protrudes from the lever 214 toward the opposite side to that of the V gear 66. The hook 218 is separated from the lock groove 204 of the inertial mass 84 when the lever 214 is disposed in the non contact position, and the hook 218 intrudes into the lock groove 204 when the lever 214 is disposed in the contact position, and the swinging of the inertial mass 84 in the lock activation direction is restrictable by the engagement (contact) of the hook 218 with the lock groove 204 (see FIG. 9).

Figure 8:
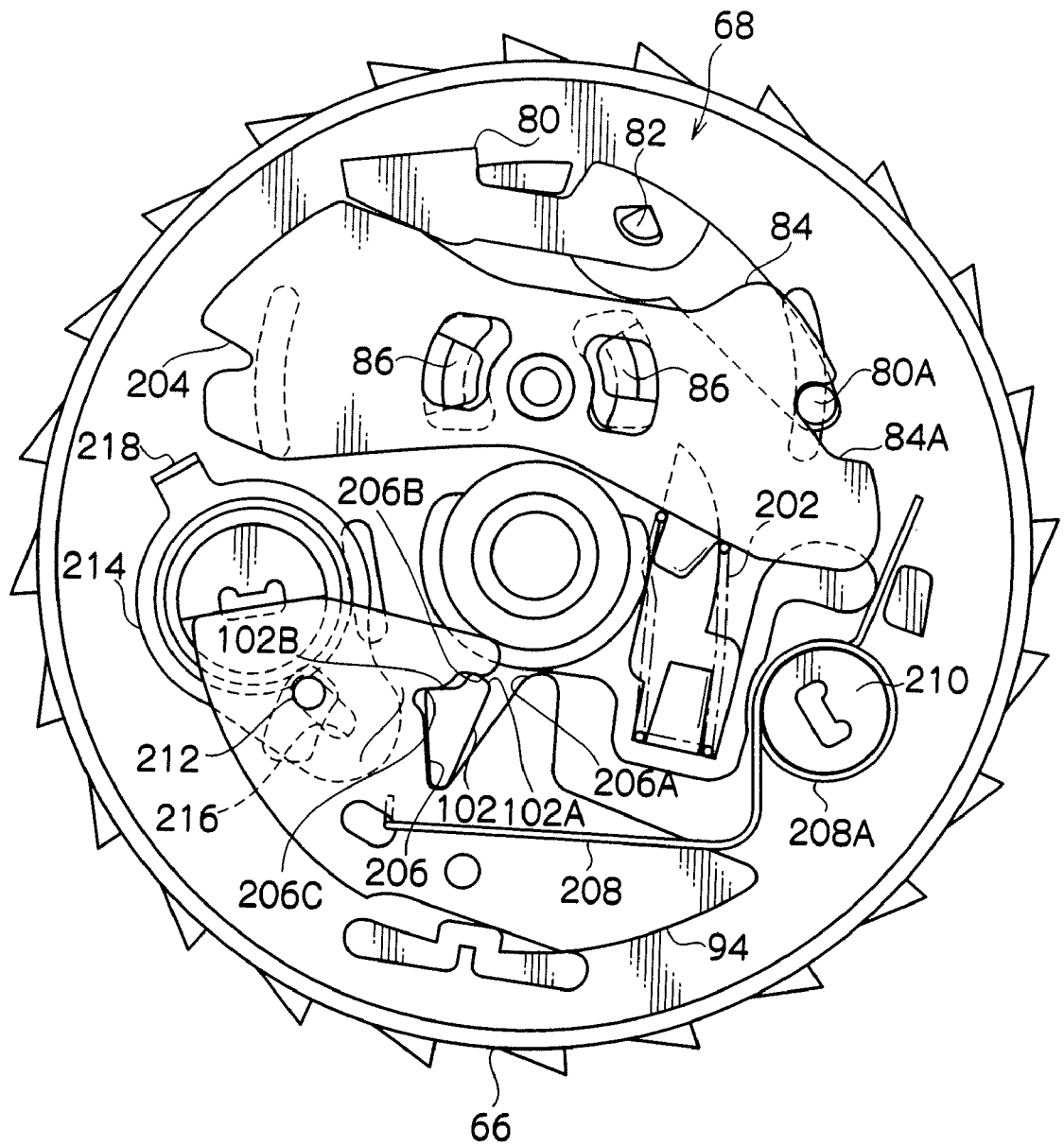
FIG. 8 is a front view, corresponding to FIG. 7, showing a state in which a rotation detection member is displaced in the lock activation direction in a webbing retracting device according to the second exemplary embodiment of the present invention.

Here, when the body of an occupant moves in a direction substantially to the front of a vehicle due to inertia as the vehicle decelerates, suddenly pulling the webbing belt 26, the spool 20 suddenly rotates in the pull out direction, and the V gear 66 rotates suddenly in the pull out direction, together with the W pawl 80, the inertial mass 84, and the lever 214. However, due to inertia, the inertial mass 84 does not rotate with respect to the V gear 66, attempts to maintain its position, and the inertial mass 84 swings relative to the V gear 66 against the biasing force of the compression coil spring 202. In doing so, the inertial mass 84 swings relative to the V gear 66, from the state shown in FIG. 7, and the inertial mass 84 presses the W pawl 80 and swings the W pawl 80, and due to this, as shown in FIG. 8, one end of the W pawl 80 approaches the vicinity of an inner peripheral portion of the gear ring 70, and meshes with the ratchet teeth formed on the inner peripheral portion of the gear ring 70.

When the webbing belt 26 is taken up on the outer peripheral portion of the spool 20 and the spool 20 is rotated in the take up direction by the biasing force of the spiral spring 36, then the V gear 66 rotates in the take up direction together with the W pawl 80, the inertial mass 84 and the lever 214. When the V gear 66 rotates in the take up direction with greater than a predetermined acceleration (angular velocity) then, due to inertia, a rotation lag is generated of the restriction weight 94 relative to the V gear 66, and the restriction weight 94 swings relative to the V gear 66 against the biasing force of the return spring 208, and also the restriction weight 94 moves to the outer peripheral side of the V gear 66 due to centrifugal force. By doing so, as shown in FIG. 9, the restriction weight 94 moves from the non contact position to the contact position, and, the rotation of the lever 214 from the non contact position to the contact position, thereby the hook 218 of the lever 214 intrudes into the lock groove 204 of the inertial mass 84, and swinging of the inertial mass 84 toward the lock activation direction is restricted. Furthermore, in the state of the spool 20 rotating in the take up direction, the restriction weight 94 maintains its contact position due to centrifugal force.

When the spool 20 has completely taken up the webbing belt 26, the spool 20 and the V gear 66 rotate suddenly, and by a very small amount, in the pull out direction, due to rebounding, and acceleration of the V gear 66 in the pull out direction occurs, and the restriction weight 94 attempts to move in the take up direction relative to the V gear 66. At this time, the restriction weight 94 is disposed in the contact position (the side face on the pull out direction side of the engagement groove 206 of the restriction weight 94 contacts with the side face on the pull out direction side of the engagement block 102), as described above, and movement of the restriction weight 94 relative to the V gear 66 toward the take up direction is prevented, and the state is maintained in which the restriction weight 94 and the lever 214 are in the contact position, and the state is maintained in which the hook 218 of the lever 214 intrudes into the lock groove 204 of the inertial mass 84.

Therefore, as described above, even if a large acceleration of the V gear 66 in the pull out direction occurs, and the inertial mass 84 attempts to swing in the lock activation direction relative to the V gear 66, the above mentioned intruding of the hook 218 into the lock groove 204 restricts swinging toward the lock activation direction of the inertial mass 84. Therefore, the inertial mass 84 does not push up the W pawl 80, and the W pawl 80 also does not mesh with the ratchet teeth of the inner peripheral portion of the gear portion 78, therefore, the webbing retracting device 200 can be effectively prevented from entering the so-called "end-lock state".

Furthermore, after the restriction weight 94 prevents swinging of the inertial mass 84, the restriction weight 94 and the lever 214 return to the non contact position from contact position due to the biasing force of the return spring 208, and restriction of the swinging of the inertial mass 84 is released.

In this manner, in the state in which the restriction weight 94 and the lever 214 are in the non contact positions, if the V gear 66 has been suddenly rotated in the pull out direction, centrifugal force also acts on the restriction weight 94. However, even if the V gear 66 rotates suddenly in the pull out direction, since the restriction weight 94 is in the non contact position (the first facing surface 206B of the restriction weight 94 is engaged with the first engaging face 102A of the engagement block 102, and also the second facing surface 206C of the restriction weight 94 is engaged with the second engaging face 102B of the engagement block 102), movement of the restriction weight 94 due to centrifugal force relative to the V gear 66 and toward the V gear 66 outer peripheral side is prevented, and the restriction weight 94 and the lever 214 are still disposed in the non contact position. Therefore, restriction of the swinging of the inertial mass 84 toward to the lock activation direction can be prevented.

In the above manner, the present exemplary embodiment is able to demonstrate similar effects to those of the above first exemplary embodiment, except for the effect due to the return spring 88 biasing both the W pawl 80 and the restriction weight 94.

Furthermore, the compression coil spring 202 biases the inertial mass 84 and also the return spring 88 biases the restriction weight 94. Therefore, each of the inertial mass 84 and the restriction weight 94 can be biased to an appropriate amount.

Also, by the movement of the restriction weight 94 from the non contact position to the contact position, the lever 214 is moved from the non contact position to the contact position, and swinging of the inertial mass 84 toward the lock activation direction is prevented by the lever 214. Therefore, the restriction weight 94 can be moved appropriately from the non contact position to the contact position by the rotation of the V gear 66 toward the take up direction, and also the swinging of the inertial mass 84 toward the lock activation direction can be appropriately restricted by the lever 214.

Third Exemplary Embodiment

Configuration of the Third Exemplary Embodiment

Figure 10:
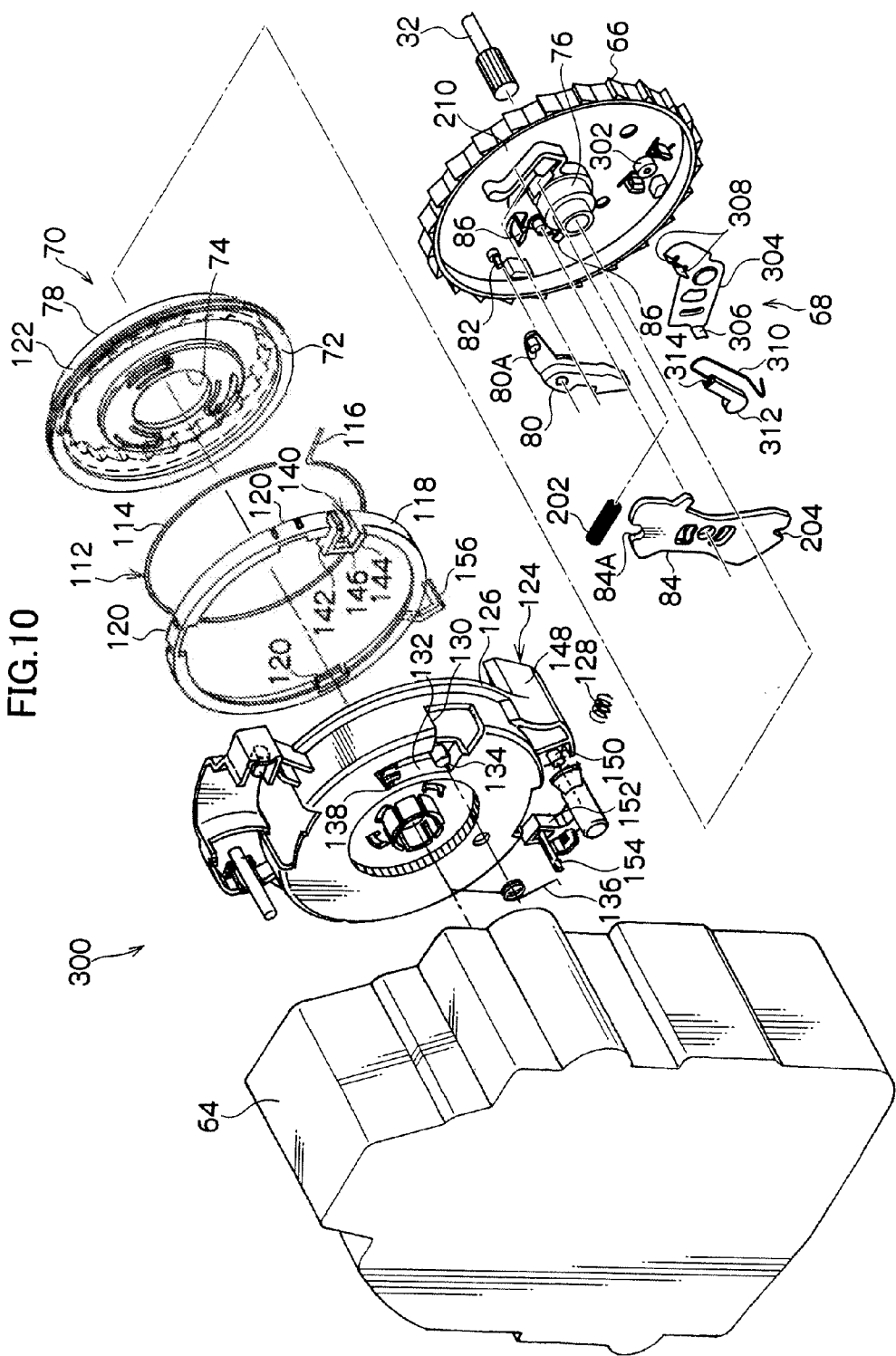
FIG. 10 is an exploded perspective view showing a configuration of relevant portions of a webbing retracting device according to a third exemplary embodiment of the present invention.
Figure 11:
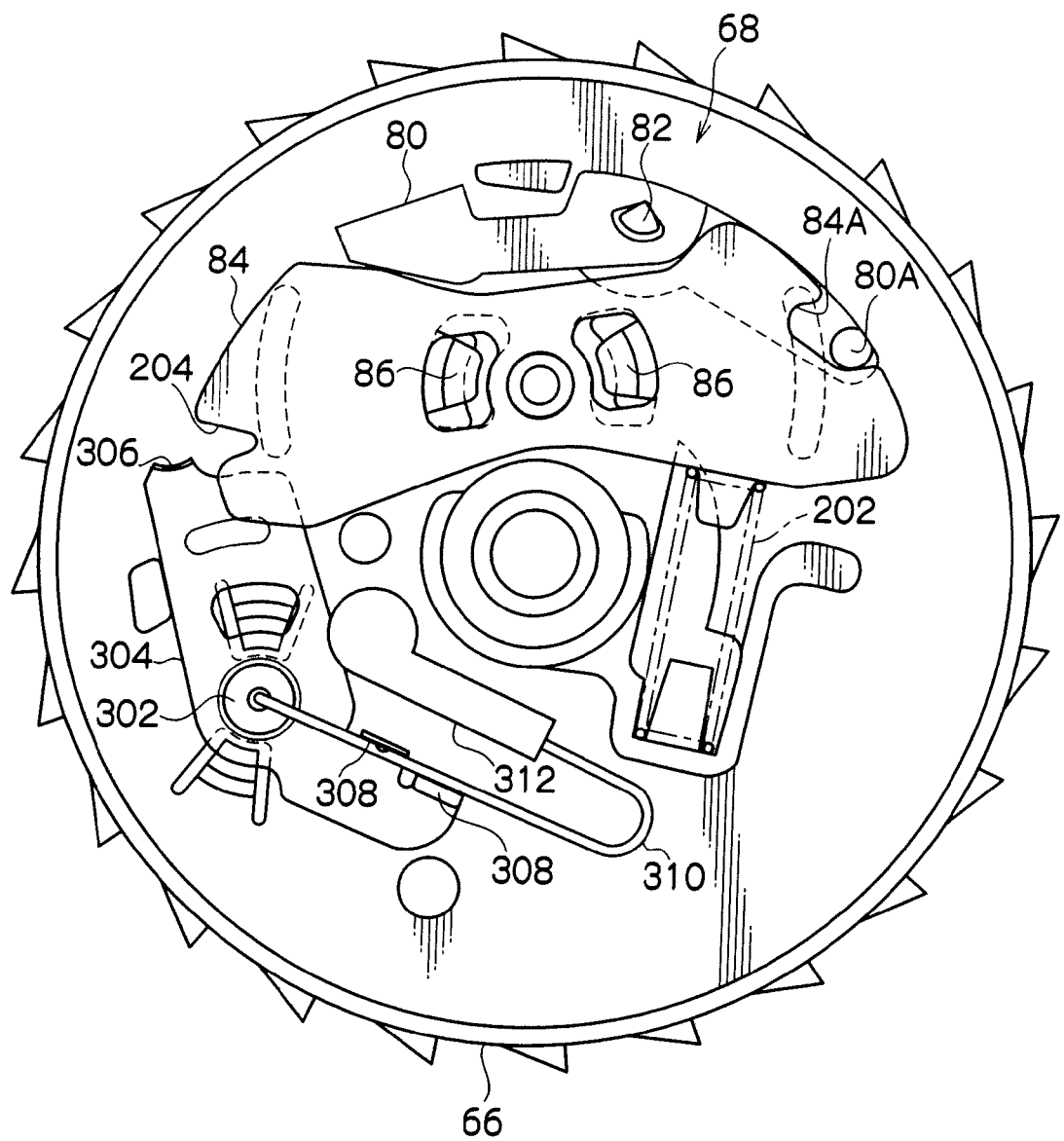
FIG. 11 is a front view of a rotational body, a rotation detection member, and a restriction unit in a webbing retracting device according to the third exemplary embodiment of the present invention.

In FIG. 10 a configuration of relevant portions of a webbing retracting device 300 according to a third exemplary embodiment of the present invention is shown through an exploded perspective view, and in FIG. 11 a configuration of relevant portions of the webbing retracting device 300 is shown through a front view.

The webbing retracting device 300 according to the present exemplary embodiment is substantially of the same configuration as the above first exemplary embodiment, but differs in the following points.

In the webbing retracting device 300 in the rotation detection mechanism 68, just as in the above second exemplary embodiment, there is provided the engagement pin 80A of the W pawl 80, and engagement hole 84A of the inertial mass 84 and the lock groove 204, and also the compression coil spring 202 spans across between the inertial mass 84 and the V gear 66.

However, the return spring 88, the restriction weight 94, the fixing pin 92 of the V gear 66, the support pin 98 and the engagement block 102 of the above first exemplary embodiment are not provided.

There is a circular rod shaped support pin 302 integrally provided to the V gear 66 at a portion in the vicinity of the pull out direction side edge of the inertial mass 84, and the support pin 302 projects from the V gear 66.

A lever 304 is provided to the outer periphery of the support pin 302 so as to be able to rotate within a limited range, and the lever 304 is an arm type, being long and substantially rectangular plate shaped.

There is a curved rectangular plate shaped hook 306, serving as a restriction portion, integrally formed to the lever 304 at a portion to the inertial mass 84 side thereof, and the hook 306 protrudes out from the lever 304 to the opposite side to that of the V gear 66. Here, when the lever 304 is in the non contact position, in which it is disposed in the rotational position toward the opposite side to that of the inertial mass 84, the hook 306 is separated from the lock groove 204 of the inertial mass 84, and when the lever 304 is in the contact position, in which it is disposed in the rotational position toward the side of the inertial mass 84, the hook 306 intrudes into the lock groove 204, and swinging of the inertial mass 84 toward the lock activation direction restrictable by the engagement (contact) of the hook 306 to the lock groove 204.

There is a pair of rectangular plate shaped connecting plates 308, serving as connecting portion, formed integrally on the lever 304 at a portion that is on the opposite side of the inertial mass 84, and the pair of connecting plates 308 project out from the lever 304 to the side that is opposite to that of the V gear 66. One of the connecting plates 308 is disposed at the center side of the V gear 66, and the other of the connecting plates 308 is disposed at the outer peripheral side of the V gear 66, and the pair of connecting plates 308 are disposed parallel to each other.

One end of a substantially U-shaped bar friction spring 310, a friction biasing member that configures a frictional force generating member, is rotatably supported at the center of the support pin 302, and the other end of the friction spring 310 is bent around in a U-shape. In a direction from one end of the friction spring 310 to the other end thereof, the friction spring 310 gradually projects out toward the direction that is the opposite to that of the V gear 66 (see FIG. 14), and the friction spring 310 has a biasing force toward the rotational axial direction. A portion at one end of the friction spring 310 intrudes at the one of the connecting plates 308 on the outer peripheral side of the V gear 66 and the other of the connecting plates 308 on the center side of the V gear 66, being attached to the lever 304, and by doing so, the friction spring 310 and the lever 304 are able to rotate integrally with each other.

Figure 15:
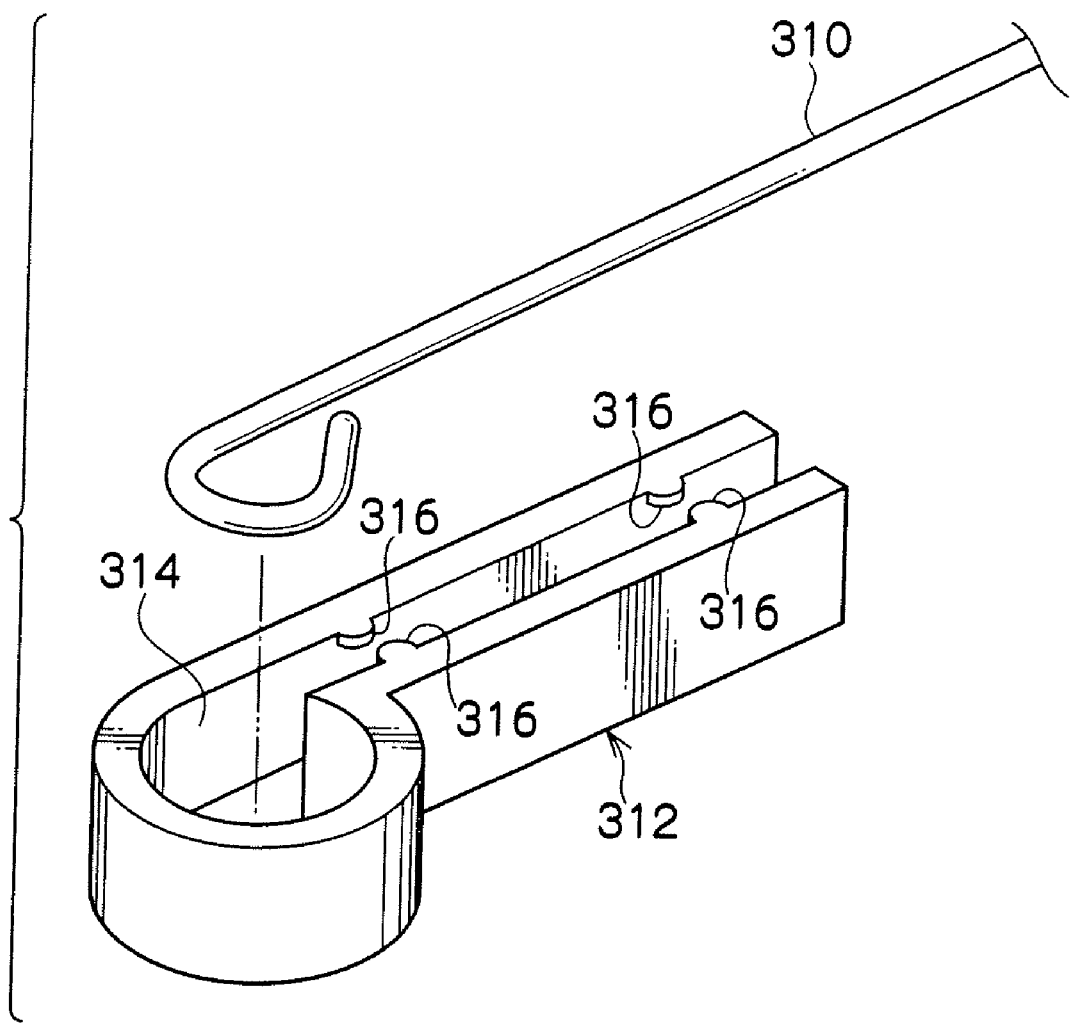
FIG. 15 is an exploded perspective view of a friction spring and a cover in a webbing retracting device according to the third exemplary embodiment of the present invention.

A substantially rectangular bar shaped cover 312 (cap), serving as a covering member configuring the friction force generation member, is mounted at a portion at the other end of the friction spring 310, and a portion at the distal end of the cover 312 projects as a semi-circular rod shape toward the center side of the V gear 66. As shown in detail in FIG. 15, there is an insertion groove 314 formed at an internal portion of the cover 312, and the insertion groove 314 is open to the V gear 66 side. A portion at the other end of the friction spring 310 fits into the insertion groove 314 of the cover 312, and in doing so the cover 312 is fitted to the friction spring 310. AT the cover 312, there are a predetermined number (four in the present exemplary embodiment) of projection portions 316 formed at portions on both sides of the opening of the insertion groove 314, and the projection portions 316 project to the opening side of the insertion groove 314, and friction spring 310 is anchored at the projection portions 316, preventing the cover 312 from falling off from the friction spring 310.

Figure 12:
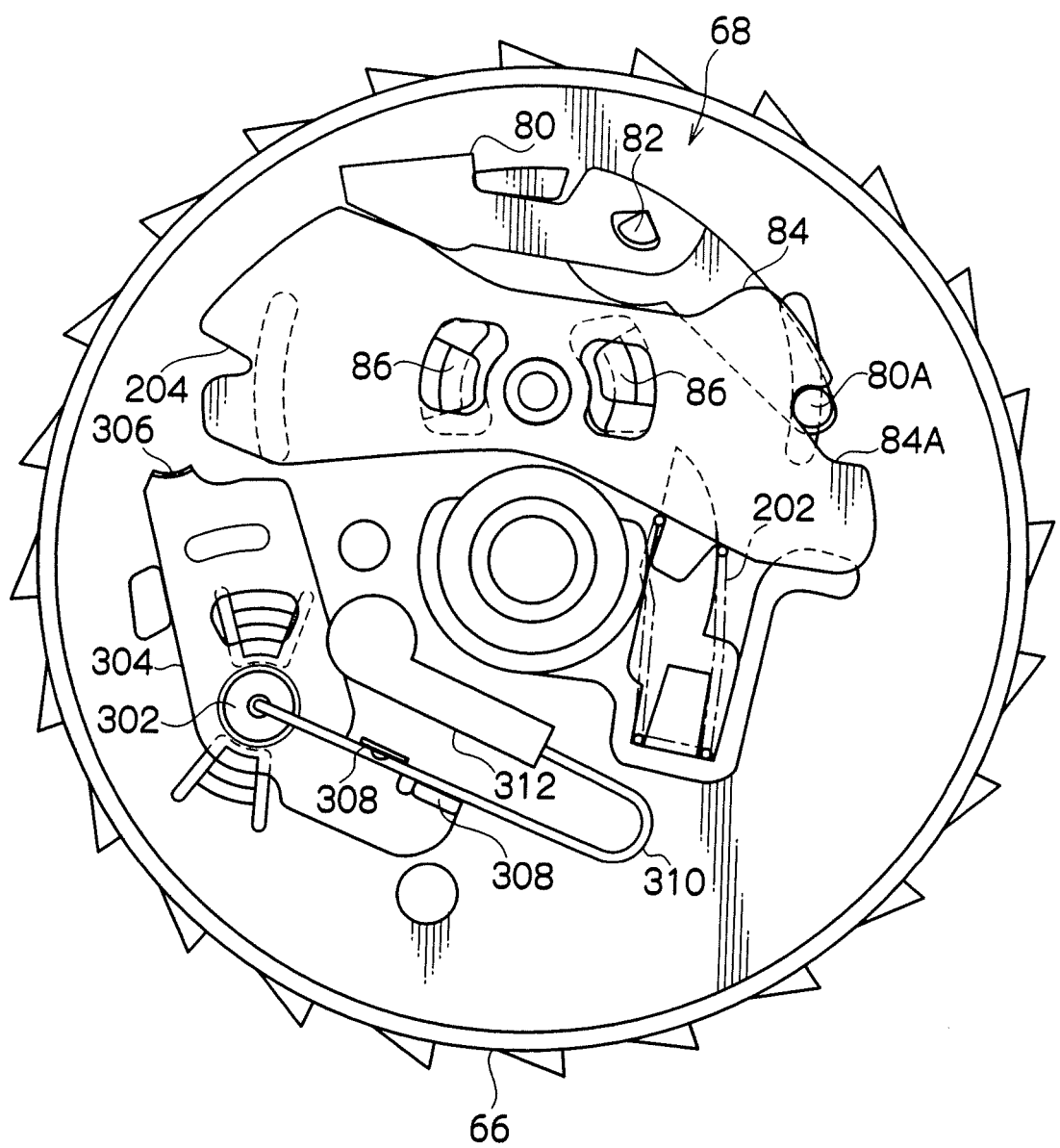
FIG. 12 is a front view, corresponding to FIG. 11, showing a state in which a rotation detection member is displaced in the lock activation direction in a webbing retracting device according to the third exemplary embodiment of the present invention.
Figure 13:
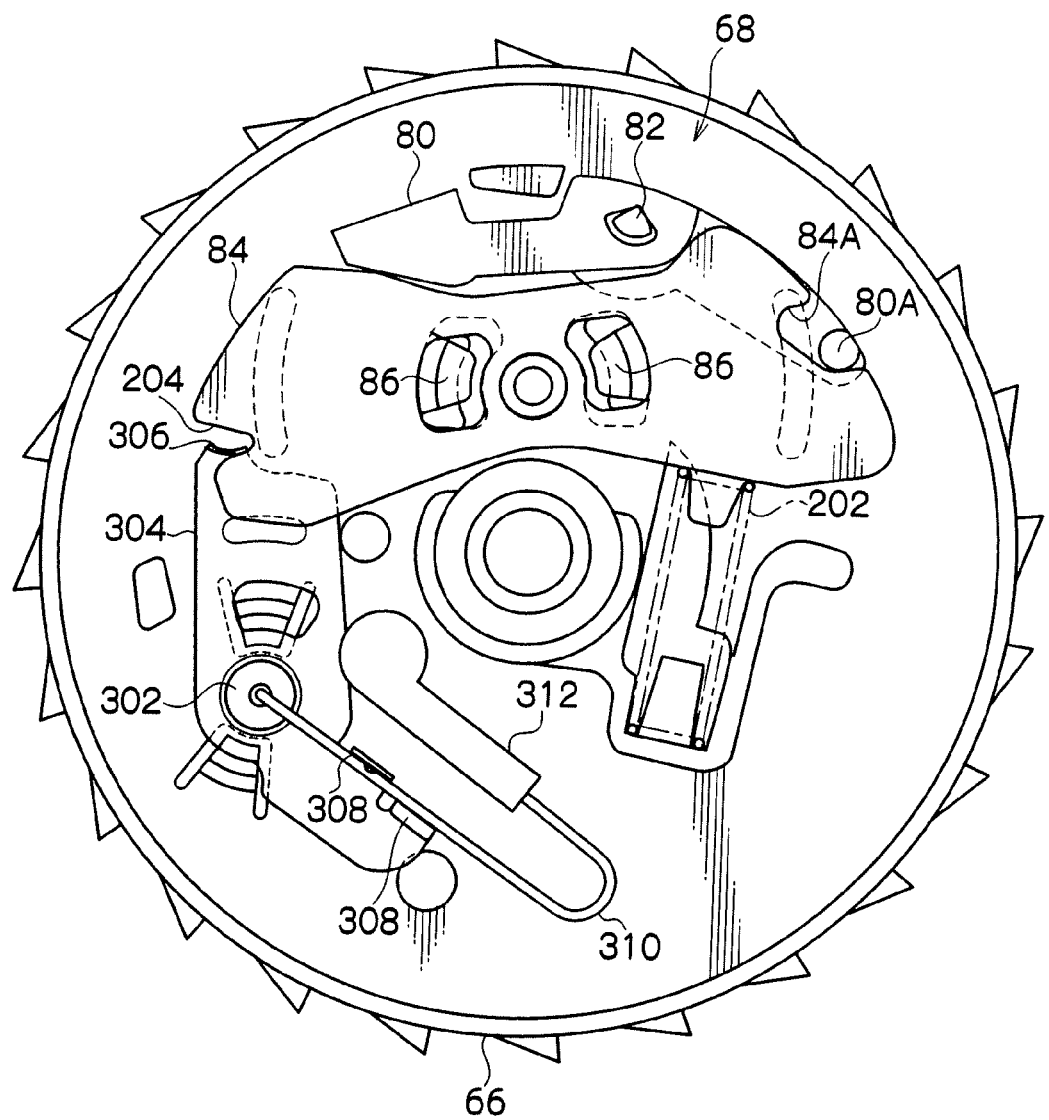
FIG. 13 is a front view, corresponding to FIG. 11, showing a state in which displacement of the rotation detection member in the lock activation direction is restricted by a restriction unit in a webbing retracting device according to the third exemplary embodiment of the present invention.
Figures 14A, 14B:
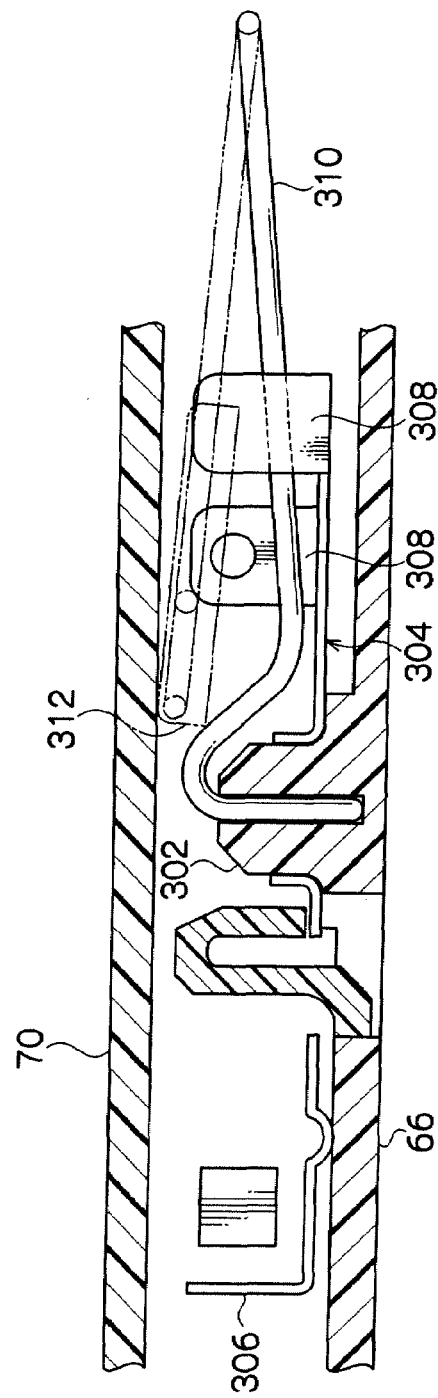
FIG. 14A is a cross-section showing the rotational body, the rotation detection member, and the restriction unit in a webbing retracting device according to the third exemplary embodiment of the present invention.
FIG. 14B is a side view showing the restriction unit in a webbing retracting device according to the third exemplary embodiment of the present invention.

A portion at the distal end of the cover 312, as shown in FIG. 14, is contacted to the V gear 66 side face (flat face) of the gear ring 70 by the biasing force of the friction spring 310, and when the V gear 66 rotates, friction is generated between the portion at the distal end of the cover 312 and the V gear 66 side face of the gear ring 70, and the cover 312, the friction spring 310 and the lever 304 rotate integrally therewith. In doing so, as shown in FIG. 12, when the V gear 66 rotates in the pull out direction, the lever 304 is disposed in the non contact position, the hook 306 of the lever 304 separates from the lock groove 204 of the inertial mass 84, and, as shown in FIG. 13, when the V gear 66 rotates in the take up direction, the lever 304 is disposed in the contact position, the hook 306 of the lever 304 intrudes into the lock groove 204.

Furthermore, as described above, the portion at the other end of the friction spring 310 is inserted in the one connecting plate 308 on the outer peripheral side of the V gear 66 of the lever 304 and the other connecting plate 308 on the center side of the V gear 66 of the lever 304, and mounted to the lever 304, therefore the lever 304 and the friction spring 310 do not contact in the directions to the V gear 66 side and the opposite side to the V gear 66. In doing so, the biasing force of the friction spring 310 is not transmitted to the lever 304 in the rotational axial direction of the friction spring 310 and the lever 304, and friction generated between the friction spring 310 and the lever 304 may be suppressed, and impediment to the rotation of the friction spring 310 and the lever 304 by the biasing force of the friction spring 310 can be suppressed.

Here, when the body of an occupant moves in a direction substantially to the front of a vehicle due to inertia as the vehicle decelerates, suddenly pulling the webbing belt 26, the spool 20 suddenly rotates in the pull out direction, and the V gear 66 rotates suddenly in the pull out direction, together with the W pawl 80, the inertial mass 84, the lever 304, and the friction spring 310 (including the cover 312). Due to inertia, the inertial mass 84 do not rotate with respect to the V gear 66, the inertial mass 84 attempts to maintain its position, and the inertial mass 84 swings relative to the V gear 66 against the biasing force of the compression coil spring 202. Furthermore, as shown in FIG. 12, friction is generated between the portion at the distal end of the cover 312 and the V gear 66 side face of the gear ring 70, and by the integral rotation of the friction spring 310 (including the cover 312) and the lever 304, the lever 304 is disposed in the non contact position, and the hook 306 of the lever 304 is separated from the lock groove 204 of the inertial mass 84. In doing so, swinging of the inertial mass 84 relative to the V gear 66 is allowed, and when the inertial mass 84 swings relative to the V gear 66 the inertial mass 84 presses the W pawl 80 and swings the W pawl 80, and one end of the W pawl 80 approached the vicinity of the inner peripheral portion of the gear ring 70, and meshes with the ratchet teeth formed on the inner peripheral portion of the gear ring 70.

However, when the webbing belt 26 is taken up on the outer peripheral portion of the spool 20, and the spool 20 is rotated in the take up direction by the biasing force of the spiral spring 36, the V gear 66 rotates in the take up direction, together with the W pawl 80, inertial mass 84, lever 304 and friction spring 310 (including the cover 312). The inertial mass 84 attempts to maintain its position without rotating with respect to the V gear 66 due to inertia, and the inertial mass 84 attempts to swing relative to the V gear 66 against the biasing force of the compression coil spring 202. Furthermore, as shown in FIG. 13, friction is generated between the portion at the distal end of the cover 312 and the V gear 66 side face of the gear ring 70, and the friction spring 310 (including the cover 312) and the insertion groove 314 integrally rotate, and the lever 304 is disposed in the contact position, the hook 306 of the lever 304 intrudes into the lock groove 204 of the inertial mass 84. In doing so, swinging of the inertial mass 84 relative to the V gear 66 is restricted.

When the spool 20 has completely taken up the webbing belt 26, even though the spool 20 and the V gear 66 rotate suddenly, and by a very small amount, in the pull out direction, due to rebounding, the lever 304 is maintained in the state of being in the contact position, and the hook 306 of the lever 304 is maintained in the state of intrusion into the lock groove 204 of the inertial mass 84.

Due to this, as described above, even if a large acceleration is generated to the V gear 66 in the pull out direction, and the inertial mass 84 attempts to swing in the lock activation direction relative to the V gear 66 due to inertia, the swinging of the inertial mass 84 in the lock activation direction is restricted by the above mentioned insertion of the hook 306 into the lock groove 204. Therefore, the inertial mass 84 does not push up the W pawl 80, and since the W pawl 80 does not mesh with the ratchet teeth on the inner peripheral portion of the gear portion 78, the webbing retracting device 300 can be effectively prevented from entering the so-called "end-lock state".

The present exemplary embodiment may also, by the above, have similar effects to those of the above first exemplary embodiment, except for the effect of being a mechanism configured for preventing entering the end-lock state by the action of the rotation force and centrifugal force of the V gear 66 and the effect of biasing both the W pawl 80 and the restriction weight 94 with the return spring 88.

Furthermore, in the present webbing retracting device 300, since the mechanism for preventing entering the end-lock state is configured using the rotation force of the V gear 66 and the frictional force of the cover 312 and the gear ring 70, the mechanism for preventing entering the end-lock state can be made compact.

Also, the lever 304 is moved from the non contact position to the contact position by the frictional force between the cover 312 and the gear ring 70, and swinging of the inertial mass 84 toward the lock activation direction is restricted by the lever 304. Therefore, the lever 304 can be moved appropriately from the non contact position to the contact position by the rotation of the V gear 66 in the take up direction, and also swinging of the inertial mass 84 toward the lock activation direction can be appropriately restricted by the lever 304.

Furthermore, a portion at the distal end of the cover 312 contacts with the gear ring 70, and a frictional force is generated between the cover 312 and the gear ring 70. Therefore, surface contact may be made between the cover 312 and the gear ring 70, and smooth and stable relative movement may be made between the cover 312 and the gear ring 70, and generation of noise due to the relative movement of the cover 312 and the gear ring 70 can be suppressed.

In the present exemplary embodiment it is configured such that the cover 312 that is attached to a portion at the other end side of the friction spring 310 and the gear ring 70 are in contact, however, the cover 312 does not need to be attached to the portion at the other end side of the friction spring 310, and it is possible that the other end of the friction spring 310 can be caused to contact with the gear ring 70.

Fourth Exemplary Embodiment

Configuration of the Fourth Exemplary Embodiment

Figure 16:
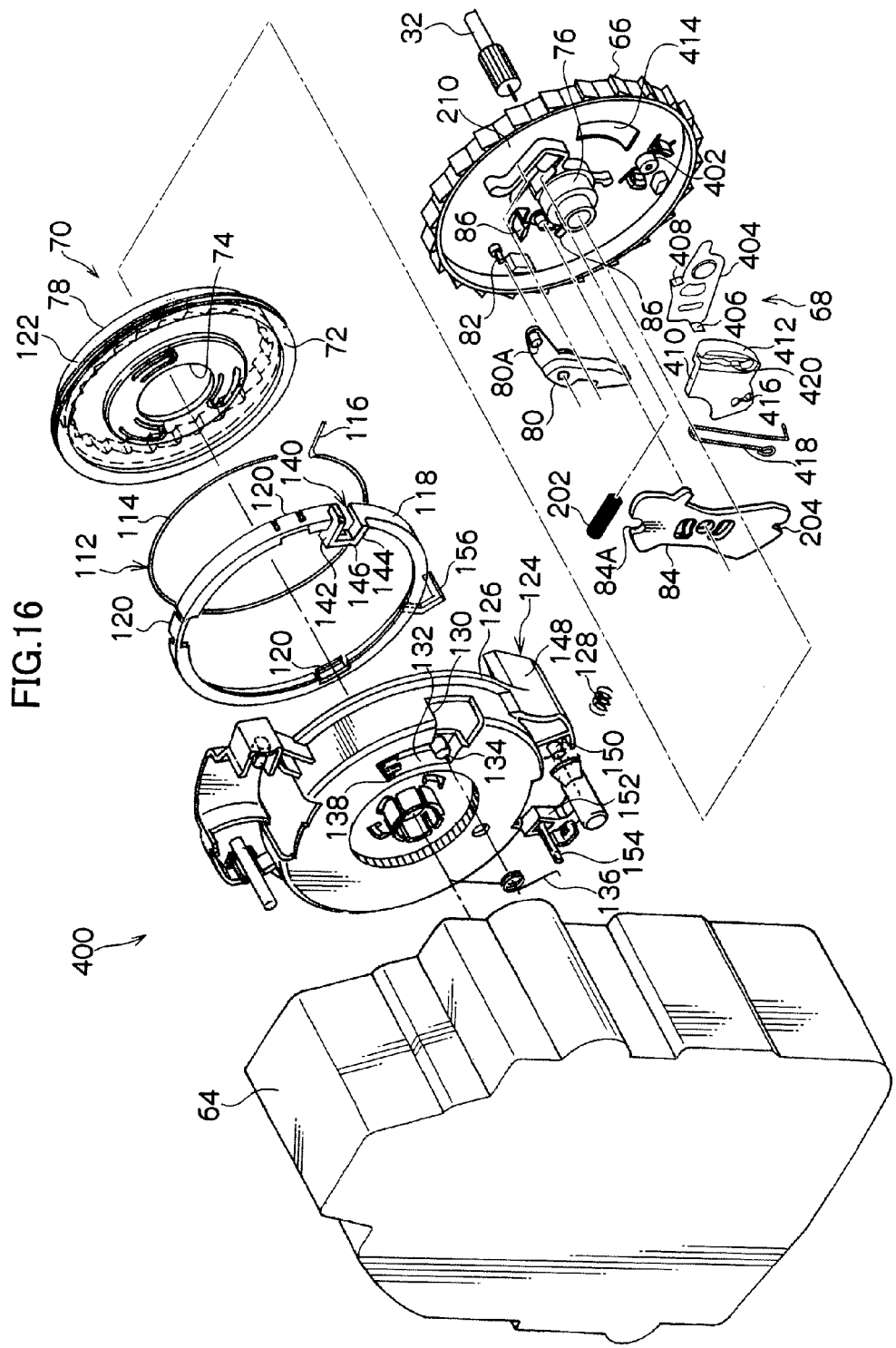
FIG. 16 is an exploded perspective view showing a configuration of relevant portions of a webbing retracting device according to a fourth exemplary embodiment of the present invention.
Figure 17:
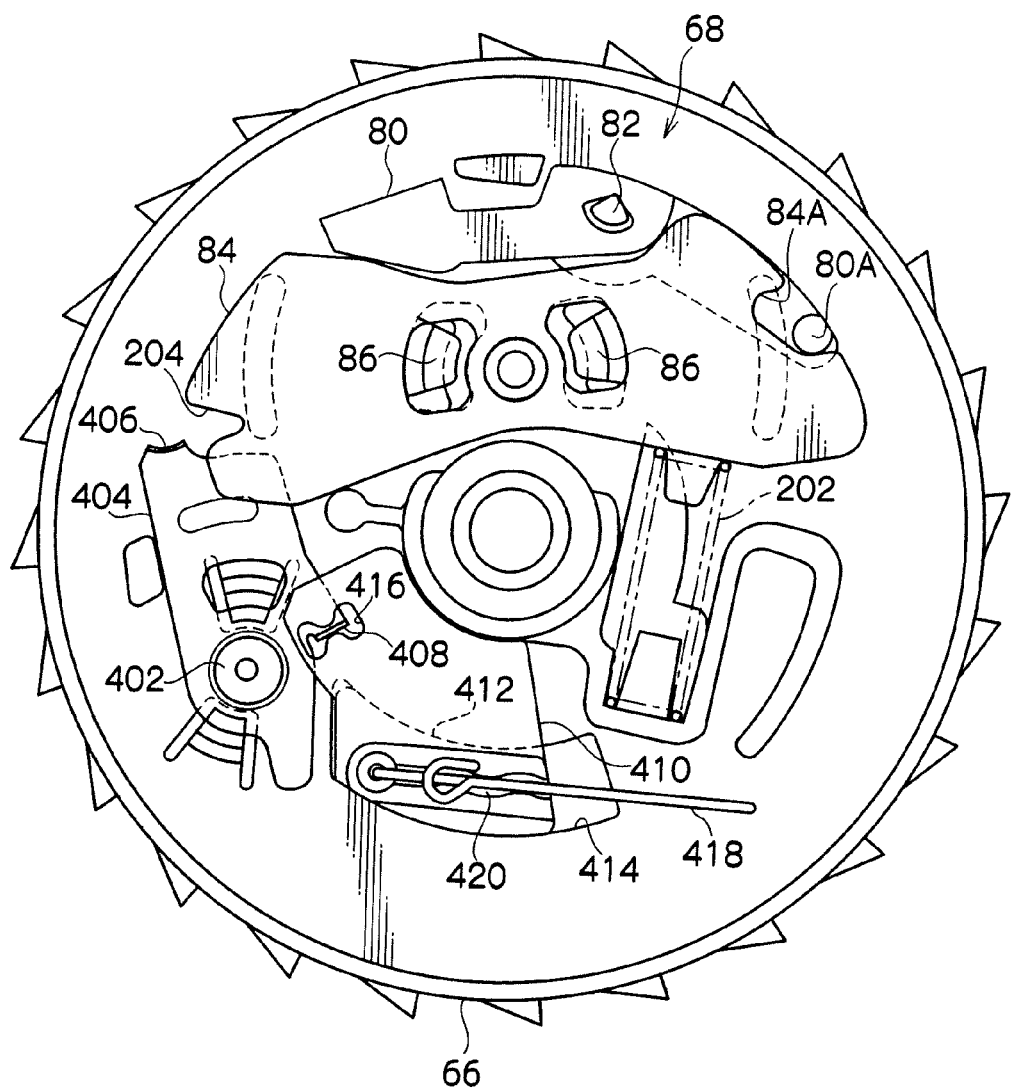
FIG. 17 is a front view of a rotational body, a rotation detection member, and a restriction unit in a webbing retracting device according to the fourth exemplary embodiment of the present invention.

In FIG. 16 a configuration of relevant portions of a webbing retracting device 400 according to a fourth exemplary embodiment of the present invention is shown through an exploded perspective view, and in FIG. 17 a configuration of relevant portions of the webbing retracting device 400 is shown through a front view.

The webbing retracting device 400 according to the present exemplary embodiment is configured essentially the same as that of the first exemplary embodiment, but differs in the following points.

At the rotation detection mechanism 68 in the webbing retracting device 400, in the same way as in the second exemplary embodiment, there is provided the engagement pin 80A of the W pawl 80, and the engagement hole 84A of the inertial mass 84 and lock groove 204, and the compression coil spring 202 also spans between the inertial mass 84 and the V gear 66.

However, the return spring 88, the restriction weight 94, the fixing pin 92 of the V gear 66, the support pin 98 and the engagement block 102 of the above first exemplary embodiment are not provided.

A circular column shaped support pin 402 is integrally provided to the V gear 66 at the vicinity to the edge portion of the inertial mass 84 at the pull out direction side, and the support pin 402 protrudes to the V gear 66 side.

A lever 404 is supported so as to be able to rotate within a predetermined range at the outer periphery of the support pin 402, and the lever 404 is a slide type lever, formed in a long substantially rectangular shape.

Figure 19:
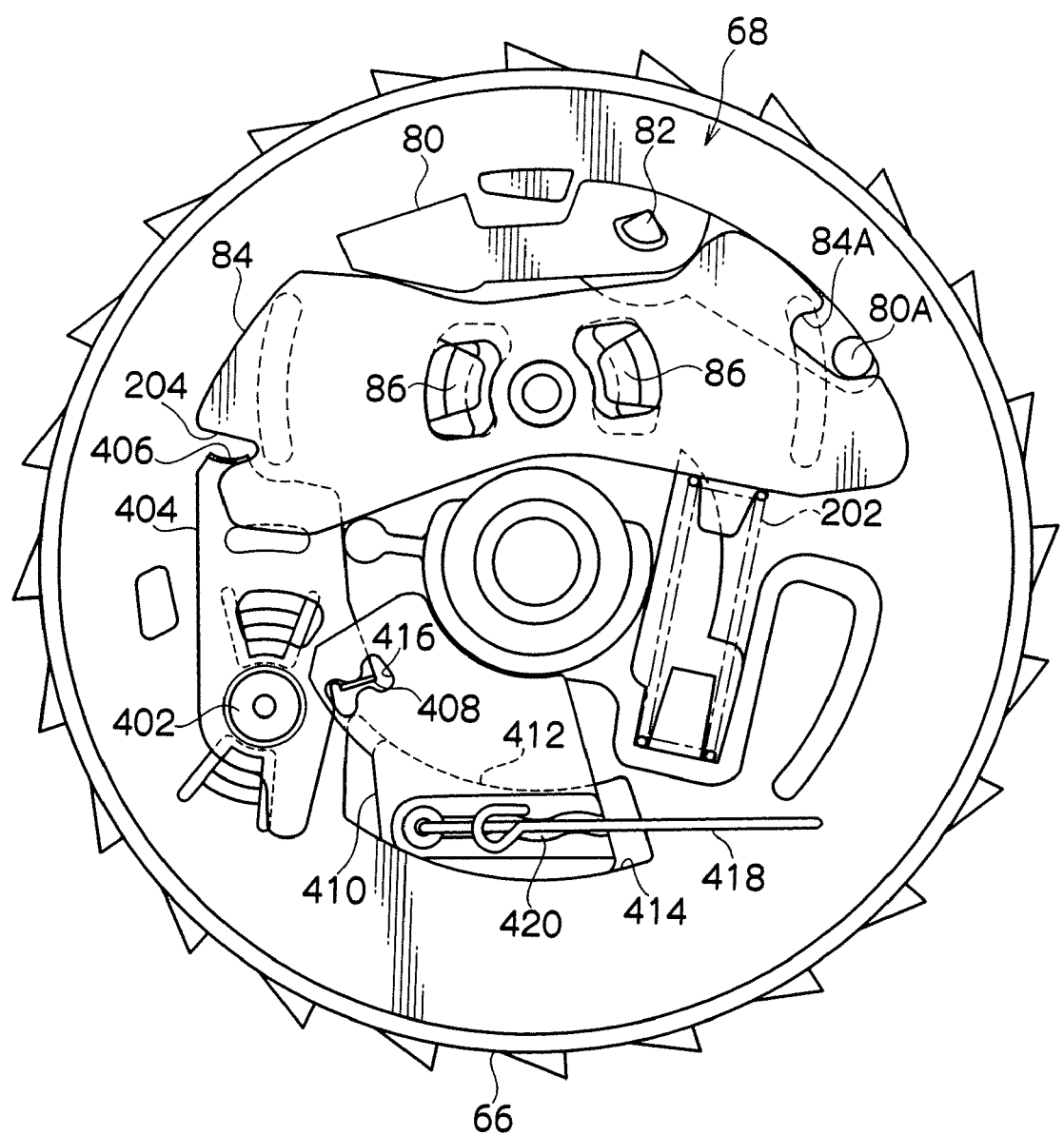
FIG. 19 is a front view, corresponding to FIG. 17, showing a state in which displacement of the rotation detection member in the lock activation direction is restricted by a restriction unit in a webbing retracting device according to the fourth exemplary embodiment of the present invention.

There is a curved rectangular plate-shaped hook 406, serving as a restriction portion, integrally formed at a portion on the inertial mass 84 side of the lever 404, and the hook 406 projects from the lever 404 to the side that is opposite to that of the V gear 66. By the lever 404 being disposed in a rotational position that is toward the side that is opposite to the inertial mass 84 side, the hook 406 is separated from the lock groove 204 of the inertial mass 84, and, as shown in FIG. 19, by the lever 404 being disposed in a contact position that is a rotational position to the inertial mass 84 side, the hook 406 intrudes into the lock groove 204, and restriction can be made of swinging of the inertial mass 84 toward the lock activation direction by engagement (contact) of the hook 406 to the lock groove 204.

There is a rectangular plate-shaped drive plate 408 integrally formed to the lever 404 at a portion that is at the opposite side to that of the inertial mass 84, and the drive plate 408 protrudes from the lever 404 to the opposite side to that of the V gear 66.

A plate-shaped slider 410, serving as a connecting member configuring a friction force generation member, is provided to the V gear 66 at the pull out direction side of the lever 404. There is a curved rectangular plate-shaped guide protrusion 412, configuring a guide member, projecting from the face on the V gear 66 side of the slider 410, and the guide protrusion 412 curves along the circumferential direction of the V gear 66. The guide protrusion 412 intrudes into a guide hole 414 and contacts a sensor holder 62 (see FIGS. 2, 20 and 21), and by the guide protrusion 412 sliding (moving) along the guide hole 414, the slider 410 is able to slide (move) in the circumferential direction of the V gear 66.

A drive hole 416, configuring a drive portion, is formed through a portion at the lever 404 side of the slider 410, and the slider 410 and the lever 404 are connected together by the drive plate 408 of the lever 404 being intruded within the drive hole 416 so as to be rotatable movable therein, and by the slider 410 sliding in the circumferential direction of the V gear 66, the lever 404 is made rotatable.

One end of a substantially U-shaped bar friction spring 418, serving as a friction biasing member configuring a friction force generation member, is rotatably supported at the surface of the slider 410 that is on the opposite side to that of the V gear 66, and the other end of the friction spring 418 is bent into a substantially U-shape. The friction spring 418 is disposed such that the portion at the other end side is more to the opposite side to that of the V gear 66 than the portion at the one end side, and the friction spring 418 has a biasing force toward the rotational axial direction. There is a wavy slot-shaped insertion groove 420 formed at the face of the slider 410 that is on the opposite side to that of the V gear 66, and a portion at the one end side of the friction spring 418 is inserted into the insertion groove 420, and rotation of the friction spring 418 relative to the slider 410 is prevented. There is a rectangular column shaped support protrusion 422 formed at a bottom face of the insertion groove 420, and a portion at the one end side of the friction spring 418 is supported at a face thereof by the support protrusion 422.

Figure 18:
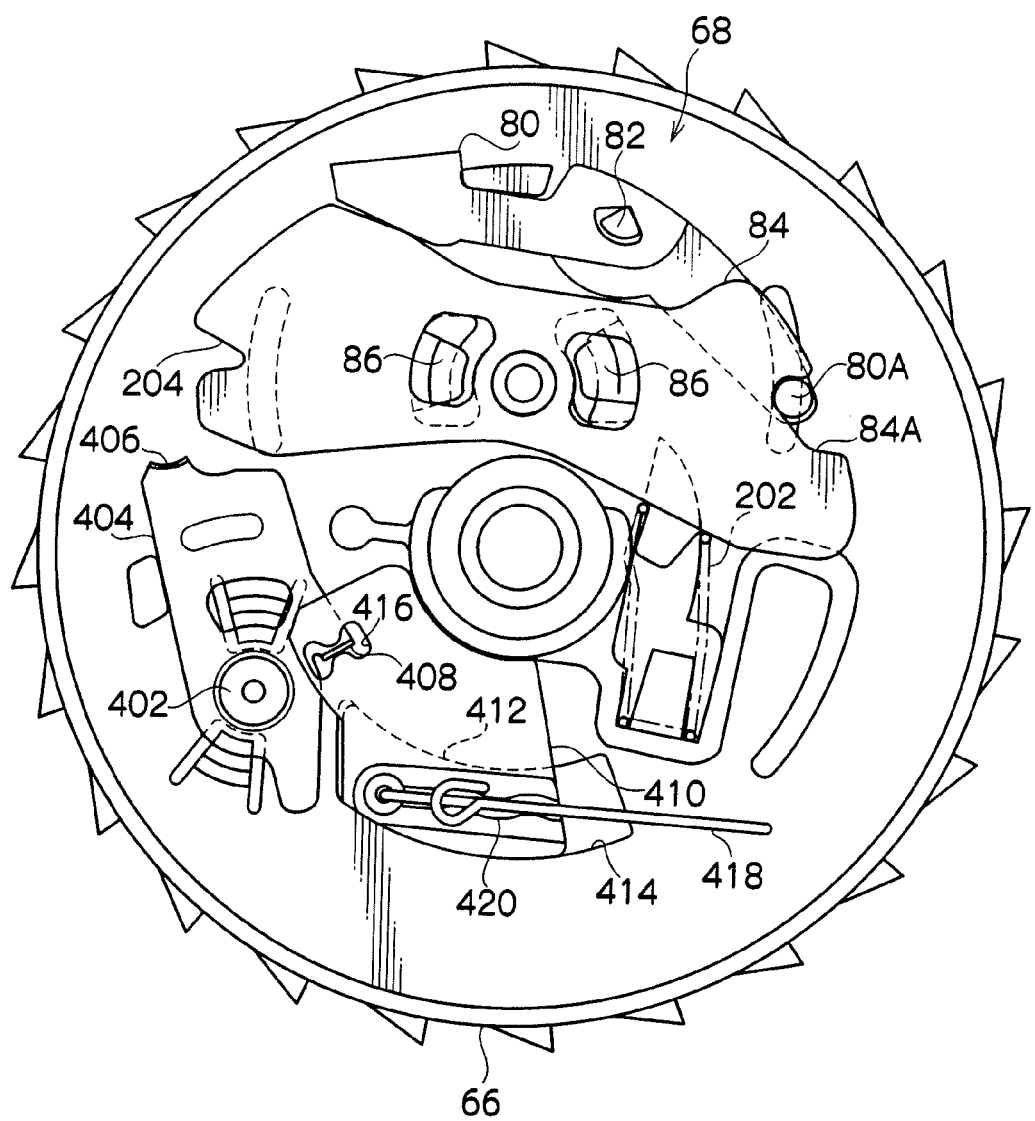
FIG. 18 is a front view, corresponding to FIG. 17, showing a state in which a rotation detection member is displaced in the lock activation direction in a webbing retracting device according to the fourth exemplary embodiment of the present invention.
Figure 20:
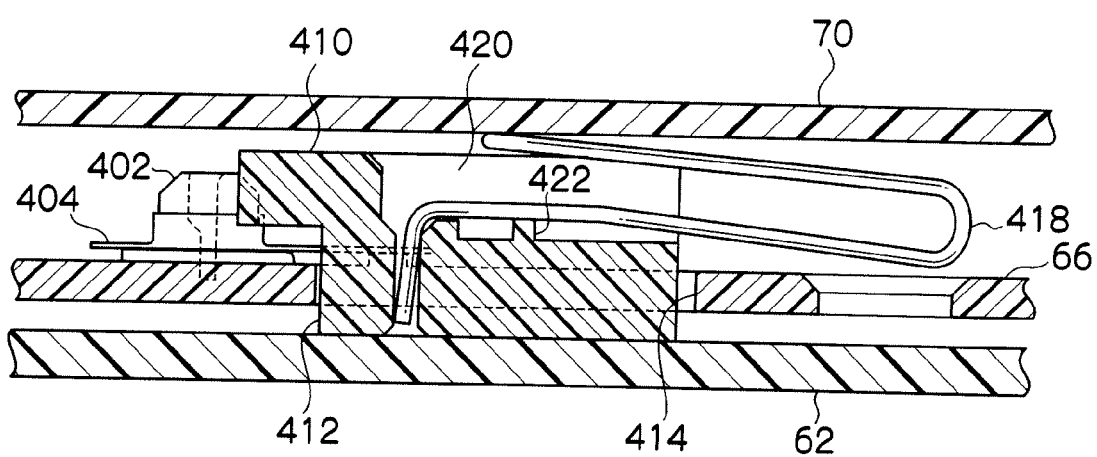
FIG. 20 is a cross-section showing the rotational body, the rotation detection member, and the restriction unit in a webbing retracting device according to the fourth exemplary embodiment of the present invention.
Figure 21:
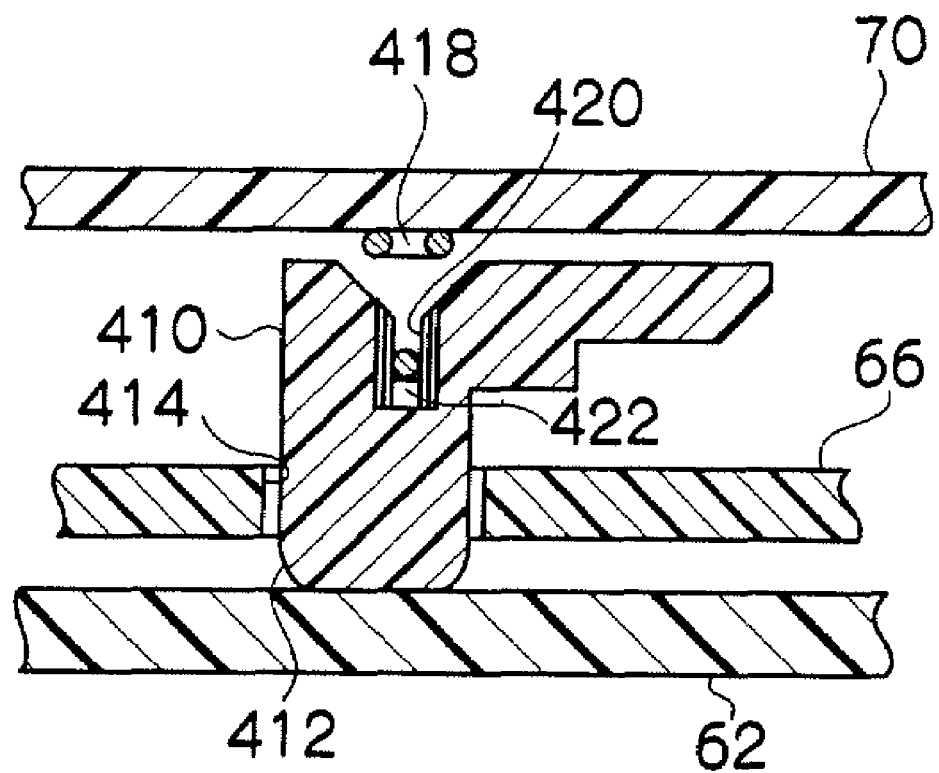
FIG. 21 is a cross-section showing the rotational body, the rotation detection member, and the restriction unit in a webbing retracting device according to the fourth exemplary embodiment of the present invention.

As shown in FIG. 20 and FIG. 21, the other end of the friction spring 418 contacts the V gear 66 side face (flat face) of the gear ring 70, due to the biasing force of the friction spring 418, and by the generation of frictional force between the other end of the friction spring 418 and the V gear 66 side face of the gear ring 70, the friction spring 418 and the slider 410 integrally slide in the V gear 66 circumferential direction relative to the V gear 66, and the lever 404 rotates. In doing so, as shown in FIG. 18, when the V gear 66 rotates in the pull out direction, the lever 404 is disposed in the non contact position, and so the hook 406 of the lever 404 separates from the lock groove 204 of the inertial mass 84, whereas, when the V gear 66 rotates in the take up direction, as shown in FIG. 19, the lever 404 is disposed in the contact position and the hook 406 of the lever 404 is inserted into the lock groove 204.

Here, when the body of an occupant moves in a direction substantially to the front of a vehicle and due to inertia as the vehicle decelerates, suddenly pulling the webbing belt 26, the spool 20 suddenly rotates in the pull out direction, and the V gear 66 rotates suddenly in the pull out direction, together with the W pawl 80, the inertial mass 84, the lever 404, the slider 410 and the friction spring 418. Due to inertia, the inertial mass 84 does not rotate with respect to the V gear 66 and attempts to maintain its position, and the inertial mass 84 swings relative to the V gear 66 against the biasing force of the compression coil spring 202. Furthermore, as shown in FIG. 18, frictional force is generated between the other end of the friction spring 418 and the V gear 66 side face of the gear ring 70, and by friction spring 418 and the slider 410 sliding in the V gear 66 circumferential direction relative to the V gear 66, the lever 404 rotates, and the lever 404 is disposed in the non contact position, and the hook 406 of the lever 404 separates from the lock groove 204 of the inertial mass 84. In doing so, the inertial mass 84 becomes able to swing relative to the V gear 66, the inertial mass 84 swings relative to the V gear 66, the inertial mass 84 presses the W pawl 80 to swing the W pawl 80, and one end of the W pawl 80 approaches the vicinity of the inner peripheral portion of the gear ring 70, and meshes with the ratchet teeth formed on the inner peripheral portion of the gear ring 70.

However, when the webbing belt 26 is taken up on the outer peripheral portion of the spool 20, the spool 20 rotates in the take up direction under the biasing force of the spiral spring 36, and the V gear 66 rotates in the take up direction, together with the W pawl 80, the inertial mass 84, the lever 404, the slider 410 and the friction spring 418. Therefore, due to inertia, the inertial mass 84 does not rotate with respect to the V gear 66 and attempts to maintain its position, and the inertial mass 84 swings relative to the V gear 66 against the biasing force of the compression coil spring 202. Furthermore, as shown in FIG. 19, a frictional force is generated between the other end of the friction spring 418 and the V gear 66 side face of the gear ring 70, by the friction spring 418 and the slider 410 sliding in the V gear 66 circumferential direction relative to the V gear 66, the lever 404 is rotated, and the lever 404 is disposed in the contact position. The hook 406 of the lever 404 is intruded into the lock groove 204 of the inertial mass 84. In doing so, the swinging of the inertial mass 84 relative to the V gear 66 is restricted.

When the spool 20 has completely been taken up the webbing belt 26, even if the spool 20 and the V gear 66 rotate due to rebounding suddenly by a very small amount in the pull out direction, the lever 404 maintains the state of being at the contact position, and the hook 406 of the lever 404 maintains the state of being intruded into the lock groove 204 of the inertial mass 84.

Therefore, as described above, even if a large degree of acceleration occurs in the V gear 66 toward the pull out direction, and due to inertia, the inertial mass 84 attempts to swing toward the lock activation direction relative to the V gear 66, due to the above mentioned intrusion of the hook 406 into the lock groove 204, swinging of the inertial mass 84 toward the lock activation direction is restricted. Therefore, the inertial mass 84 does not push up the W pawl 80, and since the W pawl 80 does not mesh with the ratchet teeth of the inner peripheral portion of the gear portion 78, the webbing retracting device 400 is effectively prevented from entering into the so-called "end-lock state".

The present exemplary embodiment may also, by the above, have similar effects to those of the above first exemplary embodiment, except for the effect of being a mechanism configured for preventing entering the end-lock state by the action of the rotation force and centrifugal force of the V gear 66, and the effect of biasing both the W pawl 80 and the restriction weight 94 with the return spring 88.

Furthermore, since the mechanism of the webbing retracting device 400 for preventing entering into the end-lock state is configured to operate with the rotation force of the V gear 66 and the frictional force between the friction spring 418 and the gear ring 70, the mechanism for preventing the end-lock state can be made compact.

Also, the lever 404 is moved from the non contact position to the contact position by the frictional force between the friction spring 418 and the gear ring 70, and swinging of the inertial mass 84 toward the lock activation direction is restrained by the lever 404. Due to this, the lever 404 may be appropriately moved from the non contact position to the contact position by the rotation of the V gear 66 in the take up direction, and also the swinging of the inertial mass 84 toward the lock activation direction can be appropriately restricted by the lever 404.

Furthermore, the since the shapes of the lever 404 and the slider 410 are simple, the suitability for assembly and the machinability can be improved, and cost may be reduced.

In the present exemplary embodiment it is configured such that the other end of the friction spring 418 and the gear ring 70 contact with each other, however, a portion at the other end side of the friction spring 418 may be, as in third exemplary embodiment, attached with a cover 312, and the cover 312 may be made to contact with the gear ring 70.

What is claimed is:

1. A webbing retracting device comprising:
   a spool that, by rotation in a take up direction, takes up a longitudinal band-shaped webbing belt from a base end side of webbing belt and stores the webbing belt thereon;
   a rotational body provided so as to be able to rotate relative to the spool and connected to the spool so as to be able to rotate to follow rotation of the spool;
   a lock member that restricts rotation of the spool in a pull out direction by activation thereof
   a rotation detection member, provided at the rotational body, that is displaced toward a predetermined lock activation direction to activate the lock member when the rotational body rotates in the pull out direction at a predetermined velocity or greater; and
   a restriction unit, provided at the rotational body, that restricts displacement of the rotation detection member toward the lock activation direction due to a rebound by stopping of taking up of the webbing belt to the spool, wherein
   the restriction unit is provided so as to be movable between a contact position, in which the restriction unit is in contact with the rotation detection member and is able to restrict displacement of the rotation detection member to the lock activation direction, and a non contact position, which is separated from the contact position and which allows displacement of the rotation detection member toward the lock activation direction; and
   the restriction unit includes a friction force generation member that generates a friction force due to rotation of the rotational body; and a displacement restriction member that is moved and biased into the contact position by the friction force generated by the friction force generation member.

2. The webbing retracting device according to claim 1, further comprising an additional biasing member that biases the rotation detection member in the opposite direction to the lock activation direction.

3. A webbing retracting device comprising:
   a spool that, by rotation in a take up direction, takes up a longitudinal band-shaped webbing belt from a base end side of webbing belt and stores the webbing belt thereon;
   a rotational body provide so as to be able to rotate relative to the spool and connected to the spool so as to be able to rotate to follow rotation of the spool;
   a lock member that restricts rotation of the spool in a pull out direction by activation thereof;
   a rotation detection member, provided at the rotational body, that is displaced toward a predetermined lock activation direction to activate the lock member when the rotational body rotates in the pull out direction at a predetermined velocity or greater; and
   a restriction unit, provided at the rotational body, that moves into a contact position to restrict displacement of the rotation detection member toward the lock activation direction due to a rebound by stopping of taking up of the webbing belt to the spool, wherein the restriction unit comprises:
   a friction force generation member that generates a friction force due to rotation of the rotational body and is moved; and
   a displacement restriction member that is moved by and biased into said contact position by the friction force generation member to restrict displacement of the rotation detection member toward the lock activation direction.

4. The webbing retracting device according to claim 1, wherein the friction force generation member includes a contact portion that contacts with the rotational body, the friction being generated between the contact portion and the rotational body when the rotational body rotates, and a friction biasing member that biases the contact portion so as to contact with the rotational body.

5. The webbing retracting device according to claim 3, wherein the friction force generation member includes a contact portion that contacts with the rotational body, the friction being generated between the contact portion and the rotational body when the rotational body rotates, and a friction biasing member that biases the contact portion so as to contact with the rotational body.

* * * * *